(12) United States Patent
Fujieda et al.

(10) Patent No.: US 11,114,912 B2
(45) Date of Patent: Sep. 7, 2021

(54) ROTATING ELECTRIC MACHINE

(71) Applicants: DENSO CORPORATION, Kariya (JP); TOYOTA JIDOSHA KABUSHIKI KAISHA, Toyota (JP)

(72) Inventors: Masahito Fujieda, Nisshin (JP); Yuichiro Ito, Kariya (JP); Shingo Nagai, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 16/574,420

(22) Filed: Sep. 18, 2019

(65) Prior Publication Data

US 2020/0099267 A1 Mar. 26, 2020

(30) Foreign Application Priority Data

Sep. 25, 2018 (JP) .............................. JP2018-179499

(51) Int. Cl.
| | |
|---|---|
| *H02K 3/28* | (2006.01) |
| *H02K 1/16* | (2006.01) |
| *H02K 3/50* | (2006.01) |
| *H02K 21/14* | (2006.01) |
| *H02K 1/27* | (2006.01) |
| *H02K 7/00* | (2006.01) |

(52) U.S. Cl.
CPC ................. *H02K 3/28* (2013.01); *H02K 1/16* (2013.01); *H02K 1/276* (2013.01); *H02K 3/50* (2013.01); *H02K 21/14* (2013.01); *H02K 7/006* (2013.01)

(58) Field of Classification Search
CPC .. H02K 3/28; H02K 1/16; H02K 3/50; H02K 3/505; H02K 21/14
See application file for complete search history.

(56) References Cited

U.S. PATENT DOCUMENTS

| 4,847,982 | A | * | 7/1989 | Morrill ..................... | H02K 3/28 |
| | | | | | 29/596 |
| 5,723,931 | A | * | 3/1998 | Andrey ..................... | H02K 3/28 |
| | | | | | 242/433 |

(Continued)

FOREIGN PATENT DOCUMENTS

| CN | 103117613 A | 5/2013 |
| JP | 2012-210094 A | 10/2012 |

(Continued)

*Primary Examiner* — Robert W Horn
(74) *Attorney, Agent, or Firm* — Oliff PLC

(57) ABSTRACT

A rotating electric machine includes a stator and a rotor. The stator includes a stator core and a stator winding that includes phase coils wound around slots of the stator core. Each phase coil is configured such that: a first end is connected to an external terminal; a second end is connected to a neutral point; and 2n (n being a natural number) circling coils are arranged to circle the stator core and connected in series. A neutral-point-side coil is housed in a first slot where a terminal-side coil is housed. The terminal-side coil is a circling coil that is arranged on the external-terminal side of a first phase coil among the phase coils. The neutral-point-side coil is a circling coil that is arranged on the neutral-point side of a second phase coil among the phase coils. The second phase coil is different in phase from the first phase coil.

10 Claims, 15 Drawing Sheets

(56) References Cited

U.S. PATENT DOCUMENTS

| | | | |
|---|---|---|---|
| 8,610,326 B2* | 12/2013 | Fukushima | H02K 3/28 |
| | | | 310/201 |
| 10,250,093 B2* | 4/2019 | Hattori | H02K 3/12 |
| 10,284,034 B2* | 5/2019 | Nakamasu | H02K 1/2786 |
| 10,367,388 B2* | 7/2019 | Kaneko | H02K 3/28 |
| 10,396,612 B2* | 8/2019 | Nakano | H02K 1/274 |
| 10,651,700 B2* | 5/2020 | Koga | H02K 3/12 |
| 10,756,587 B2* | 8/2020 | Tachikawa | H02K 3/34 |
| 10,998,791 B2* | 5/2021 | Kuroyanagi | H02K 3/345 |
| 2013/0076188 A1 | 3/2013 | Ikeda et al. | |
| 2014/0346910 A1* | 11/2014 | Nakano | B62D 5/0463 |
| | | | 310/156.01 |
| 2015/0028714 A1* | 1/2015 | Matsuoka | H02K 3/12 |
| | | | 310/198 |
| 2019/0006903 A1* | 1/2019 | Kuroyanagi | H02K 3/34 |
| 2020/0014267 A1* | 1/2020 | Rahman | H02K 1/16 |
| 2020/0099267 A1* | 3/2020 | Fujieda | H02K 21/14 |
| 2020/0395805 A1* | 12/2020 | Suwazono | H02K 1/16 |

FOREIGN PATENT DOCUMENTS

| | | | |
|---|---|---|---|
| JP | 2012-239358 A | 12/2012 | |
| JP | 2013-081356 A | 5/2013 | |
| JP | 2015-006082 A | 1/2015 | |
| JP | 2017-073893 A | 4/2017 | |

\* cited by examiner

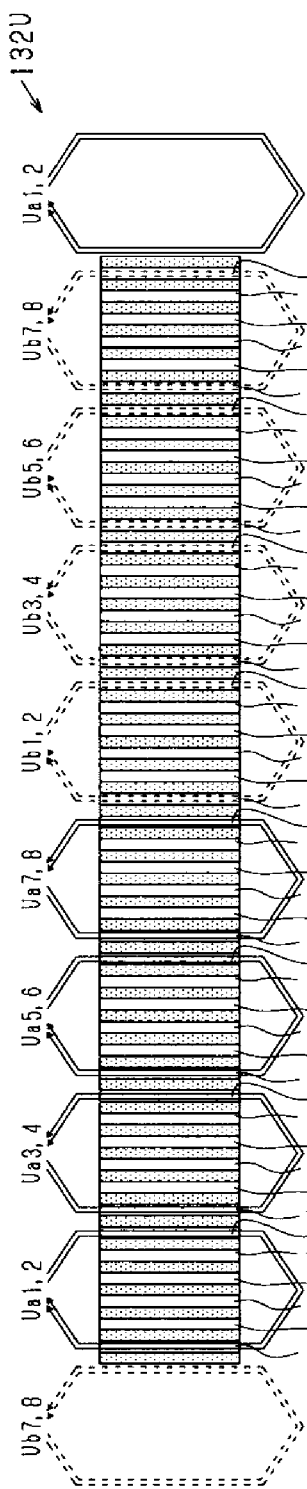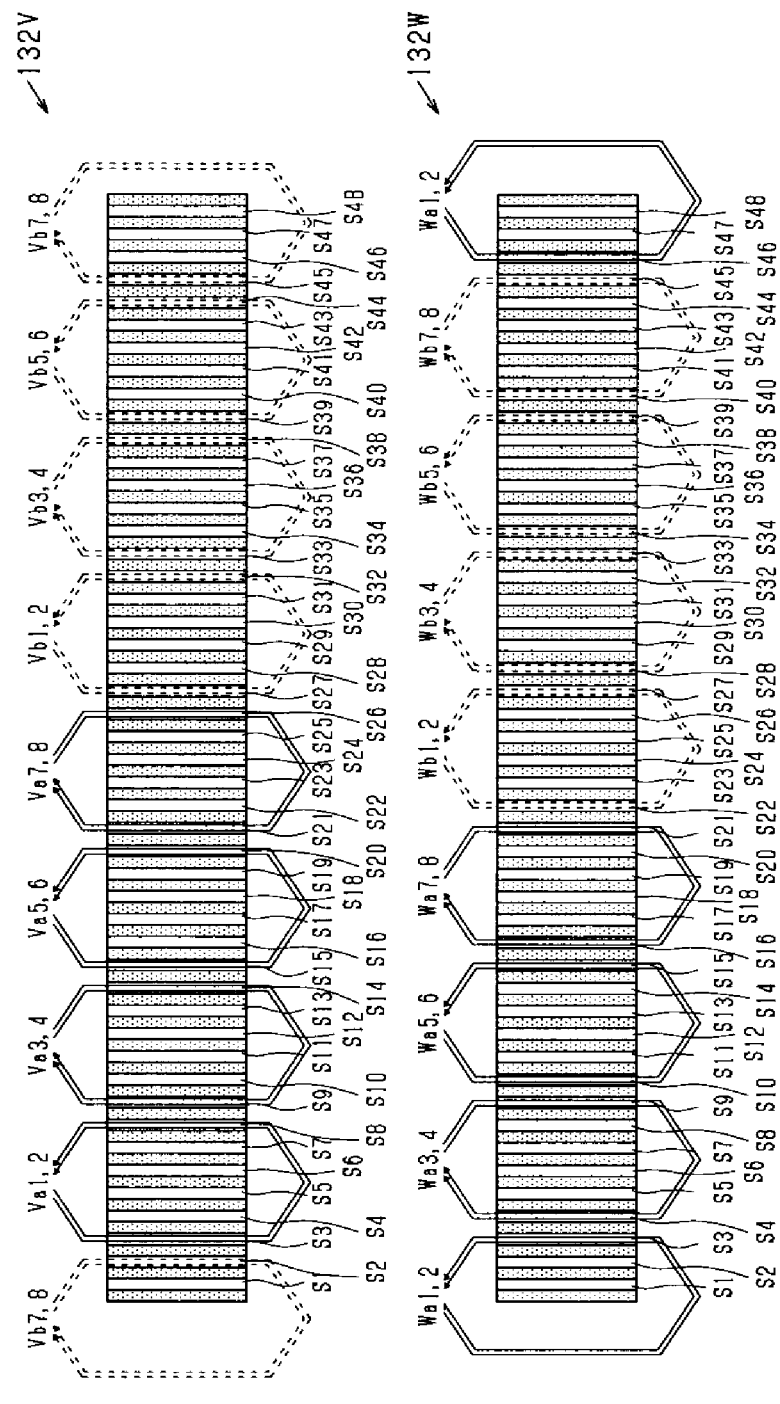
FIG.7A  FIG.7B  FIG.7C

ROTATING ELECTRIC MACHINE

CROSS-REFERENCE TO RELATED APPLICATION

This application is based on and claims the benefit of priority from Japanese Patent Application No. 2018-179499, filed Sep. 25, 2018. The entire disclosure of the above application is incorporated herein by reference.

BACKGROUND

Technical Field

The present disclosure relates to a rotating electric machine.

Related Art

A rotating electric machine that includes a stator core and a stator winding is conventionally known. The stator core has a circular annular shape and is provided with a plurality of slots in a circumferential direction. The stator winding is wound around the slots.

SUMMARY

The present embodiment provides a rotating electric machine that includes a stator and a rotor. The stator includes: a stator core with slots; and a stator winding that includes a plurality of phase coils wound around the slots. The rotor includes a plurality of magnetic poles. Each phase coil is configured such that: a first end is connected to an external terminal; a second end is connected to a neutral point; and 2n (n being a natural number) circling coils are arranged so as to circle the stator core and connected in series. A neutral-point-side coil is housed in a first slot in which a terminal-side coil is housed. The terminal-side coil is a circling coil that is arranged on the external-terminal side of a first phase coil among the phase coils. The neutral-point-side coil is a circling coil that arranged on the neutral-point side of a second phase coil among the phase coils. The second phase coil is different in phase from the first phase coil.

BRIEF DESCRIPTION OF THE DRAWINGS

In the accompanying drawings:

FIG. 7A to FIG. 7C are winding diagrams of the circling coils for each phase coil in the conventional configuration;

DESCRIPTION OF THE EMBODIMENTS

Figure 1:
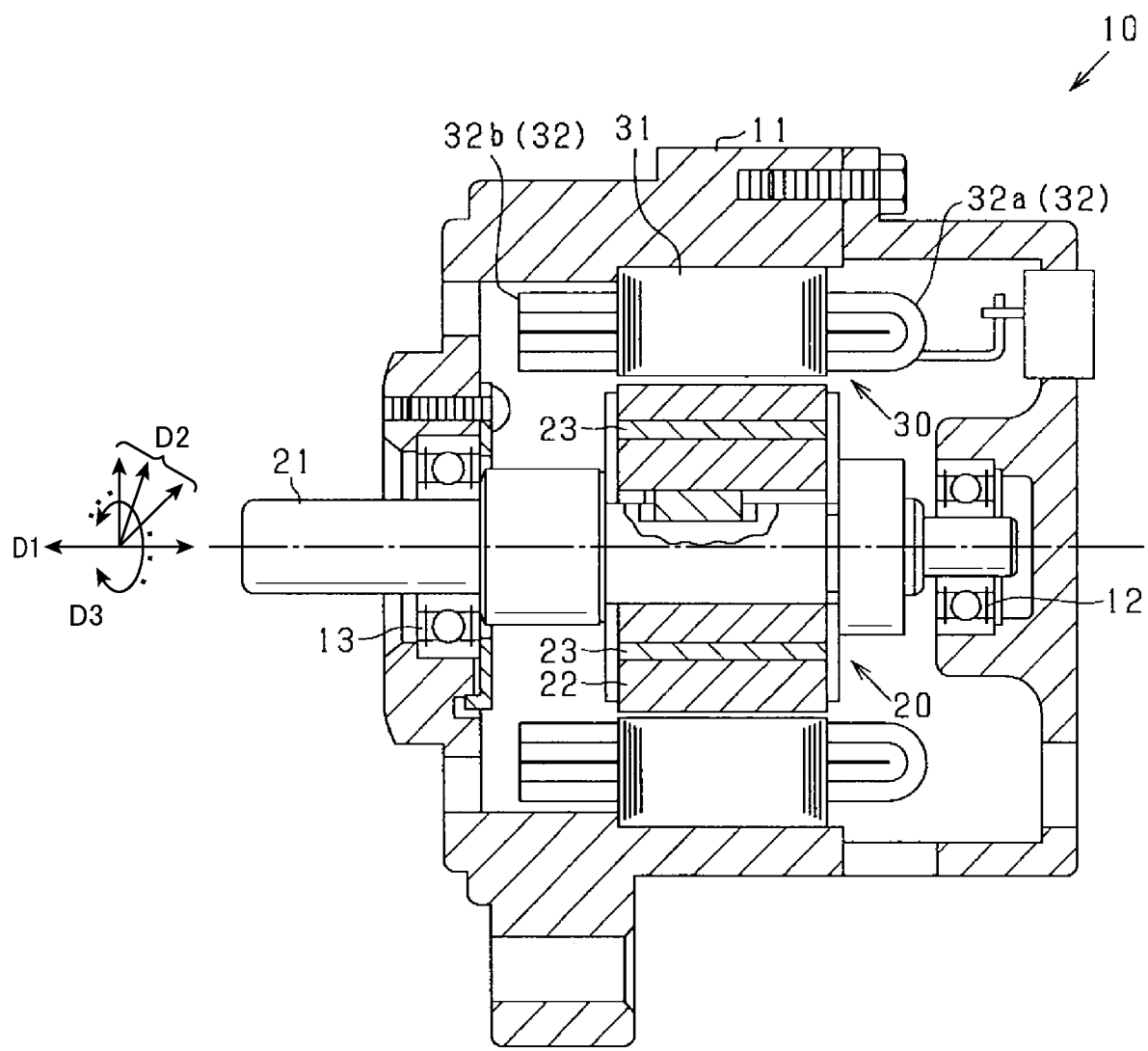
FIG. 1 is a cross-sectional view of an overall structure of a drive motor according to a first embodiment.

In the rotating electric machine such as this, the following is known to occur. That is, when a square-wave voltage is applied, a resonance phenomenon occurs in the stator winding as a result of high-frequency components of the square-wave voltage, and the voltage is amplified (refer to JP-A-2013-081356). When a maximum interphase voltage increases as a result of voltage amplification, short-circuiting may occur. Therefore, insulation performance between phases is required to be improved. However, to improve insulation performance between phases, an insulating film may be made thicker or the like. As a result, increase in interphase distance becomes an issue. That is, decrease in space factor (density) of the winding, increase in size, or the like becomes an issue.

Here, in the rotating electric machine in JP-A-2013-081356, when a phase winding of the same phase is divided from one end to the other end into four windings, and the divided windings are a first partial winding, a second partial winding, a third partial winding, and a fourth partial winding, in order from the one end, the first partial winding and the fourth partial winding are housed in differing slots of the same phase. As a result, magnetic coupling between the first partial winding a and the fourth partial winding d is weakened. Mutual inductance can be set close to 0, and resonance can be suppressed. Therefore, the insulation performance that is required can be reduced and the interphase distance can be reduced.

However, to obtain further size reduction and density increase in the rotating electric machine, further reduction of the interphase distance, multipolarization, and the like may be required. In such cases, the distance between windings becomes close regardless of the manner in which the windings are housed in the slots. Therefore, increase in magnetic coupling (mutual inductance) between the windings is unavoidable. Consequently, in the configuration in JP-A-2013-081356, it is difficult to achieve both a reduction effect in the interphase distance, and size reduction and density increase in the rotating electric machine.

It is thus desired to provide a rotating electric machine that is capable of achieving size reduction and density increase in windings while suppressing a maximum interphase voltage.

An exemplary embodiment provides a rotating electric machine that includes: a stator that includes a stator core that has a circular cylindrical shape and is provided with a plurality of slots that are arranged in a circumferential direction, and a stator winding that includes a plurality of phase coils that are wound around the slots; and a rotor that is arranged so as to oppose the stator in a radial direction and has a plurality of magnetic poles in the circumferential direction.

In the rotating electric machine, each phase coil is configured such that: a first end is connected to an external terminal; a second end is connected to a neutral point; and 2n (n being a natural number) circling coils are arranged so as to circle the stator core and connected in series. A neutral-point-side coil is housed in a first slot in which a terminal-side coil is housed. The terminal-side coil is a circling coil that is arranged on the external-terminal side of a first phase coil among the phase coils. The neutral-point-side coil is a circling coil that is arranged on the neutral-point side of a second phase coil among the phase coils. The second phase coil is different in phase from the first phase coil.

When a square-wave voltage is applied to the stator winding as a result of switching or the like, a resonance phenomenon (surge) occurs as a result of high-frequency components of the square-wave voltage. At this time, a resonance current that flows to the terminal-side coils and a resonance current that flows to the neutral-point-side coils are in opposite directions. Here, the neutral-point-side coil of the second phase coil is housed in the first slot in which the terminal-side coil of the first phase coil is housed. As a result, mutual magnetic induction is generated between the terminal-side coil of the first phase coil and the neutral-point-side coil of the second phase coil.

A surge voltage that is generated in each circling coil can be reduced. As a result, a maximum interphase voltage can be suppressed. As a result of this reduction effect, an interphase distance for insulation can be shortened. Size reduction and density increase in the windings can be obtained. In addition, because distance between windings becomes shorter and the mutual magnetic induction increases, a greater reduction effect can be obtained.

First Embodiment

An embodiment implementing a rotating electric machine of the present disclosure as a drive motor for generating drive power of a vehicle will hereinafter be described. In the following drawings, reference signs D1, D2, and D3 respectively indicate an axial direction, a radial direction, and a circumferential direction in the rotating electric machine.

First, a configuration of a drive motor 10 that corresponds to the rotating electric machine according to the present embodiment will be described. FIG. 1 is a cross-sectional view of an overall structure of the drive motor 10 according to the present embodiment. In addition, FIG. 2 is a circuit diagram of the drive motor 10. As shown in FIG. 1, the drive motor 10 according to the present embodiment includes a housing 11, a rotor 20, and a stator 30. The drive motor 10 is a three-phase alternating-current rotating electric machine.

The rotor 20 includes a rotation shaft 21, a rotor core 22, and a permanent magnet 23. The rotor core 22 is fixed to the rotation shaft 21. In addition, the rotation shaft 21 is supported by the housing 11 via a set of bearings 12 and 13, so as to freely rotate. A plurality of permanent magnets 23 are arranged so as to be embedded at a predetermined pitch in the circumferential direction D3 of the rotor core 22. The permanent magnets 23 are magnetized such that polarities thereof alternately differ in the circumferential direction D3. Here, for example, the structure of the rotor 20 can be replaced with various publicly known types, such as a winding-field type in which a field winding is wound around a Lundell-pole core.

The stator 30 is arranged on an outer side of the rotor 20 in the radial direction D2. The stator 30 includes a stator core 31 and a stator winding 32. The stator core 31 has a circular cylindrical shape and is fixed to an inner circumferential surface of a circumferential wall of the housing 11. The stator winding 32 is wound around slots 35 of the stator core 31. In addition, a first coil end portion 32a of the stator winding 32 protrudes in a direction along the rotation shaft 21, from one end surface of the stator core 31 in the axial direction D1. A second coil end portion 32b of the stator winding 32 protrudes in the direction along the rotation shaft 21, from the other end surface of the stator core 31 in the axial direction D1.

Figure 2A:
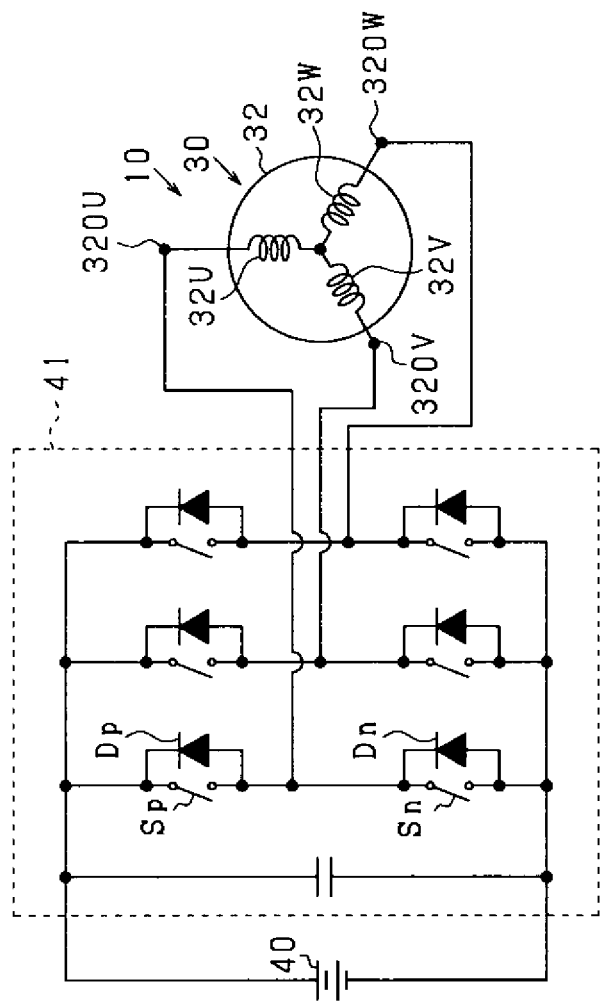
FIG. 2A is a circuit diagram of the drive motor.
Figure 2B:
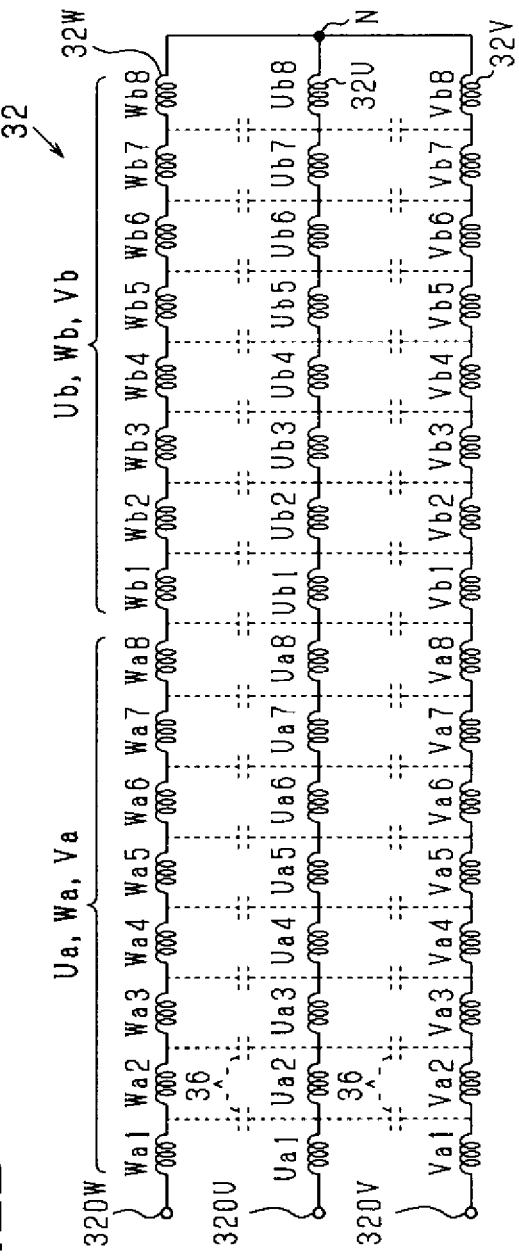
FIG. 2B is a circuit diagram of a stator winding of a stator provided in the drive motor.

As shown in FIG. 2A and FIG. 2B, the stator winding 32 is formed such that a U-phase coil 32U, a V-phase coil 32V, and a W-phase coil 32W are connected at a neutral point N, thereby forming a Y-connection. As shown in FIG. 2B, the U-phase coil 32U is formed by sixteen circling coils (revolution coils) Ua1 to Ua8 and Ub1 to Ub8 being connected in series. In a similar manner, the V-phase coil 32V is formed by sixteen circling coils Va1 to Va8 and Vb1 to Vb8 being connected in series. The W-phase coil 32W is formed by sixteen circling coils Wa1 to Wa8 and Wb1 to Wb8 being connected in series.

Here, the circling coils of the U-phase coil 32U are arranged in a circuit in the following sequence: external terminal 320U of the U-phase coil 32U, circling coil Ua1, circling coil Ua2, . . . , circling coil Ua8, circling coil Ub1, circling coil Ub2, . . . , circling coil Ub8, and neutral point N.

In a similar manner, the circling coils of the V-phase coil 32V are arranged in a circuit in the following sequence: external terminal 320V of the V-phase coil 32V, circling coil Va1, circling coil Va2, . . . , circling coil Va8, circling coil Vb1, circling coil Vb2, . . . , circling coil Vb8, and neutral point N.

In a similar manner, the circling coils of the W-phase coil 32W are arranged in a circuit in the following sequence: external terminal 320W of the W-phase coil 32W, circling coil Wa1, circling coil Wa2, . . . , circling coil Wa8, circling coil Wb1, circling coil Wb2, . . . , circling coil Wb8, and neutral point N.

An inverter 41 is connected between a battery 40, and the external terminal 320U, the external terminal 320V, and the external terminal 320W. The inverter 41 includes six power elements 42.

Specifically, the inverter 41 is a full-bridge circuit that has a same number of upper arms and a same number of lower arms as the number of phases of the stator winding 32. The inverter 41 configures a three-phase full-wave rectifier circuit. The inverter 41 configures a drive circuit for driving the drive motor 10 by adjusting electric power that is supplied to the drive motor 10. That is, the inverter 41 has switches Sp and Sn as the power elements 42, and adjusts an energization current that flows to the drive motor 10.

The inverter 41 includes the upper-arm switch Sp and the lower-arm switch Sn for each phase. According to the present embodiment, a voltage-control-type semiconductor switching element is used for each of the switches Sp and Sn. Specifically, an N-channel metal-oxide-semiconductor field-effect transistor (MOSFET) is used. An upper-arm diode Dp is connected to the upper-arm switch Sp in antiparallel. A lower-arm diode Dn is connected to the lower-arm switch Sn in antiparallel. According to the present embodiment, respective body diodes of the switches Sn and Sp are used as the diodes Dp and Dn. Here, the diode is not limited to the body diode. For example, the diodes may be separate components from the switches Sp and Sn.

An intermediate connection point of a series-connection body that includes the switches Sp and Sn for each phase is connected to one end of the corresponding phase coil 32U, 32V, or 32W. The phase coils 32U, 32V, and 32W are connected by a star connection (Y-connection). Therefore, the other ends of the phase coils 32U, 32V, and 32W are connected to one another at the neutral point N.

When the vehicle is driven, switching operation of the power elements 42 is appropriately performed based on a command from a controller (not shown). A three-phase alternating-current voltage is applied to the stator winding 32 from the battery 40, via the inverter 41. The rotor 20 rotates as a result of the applied voltage. The rotation shaft 21 of the rotor 20 is directly connected to a crank shaft (not shown) of an engine. Alternatively, the rotation shaft 21 is connected to the crank shaft with a clutch, a gear, or the like therebetween. In cases in which the rotation shaft 21 is directly connected to the crank shaft, the engine is started as a result of the rotation of the rotation shaft 21 of the rotor 20.

Figure 3:
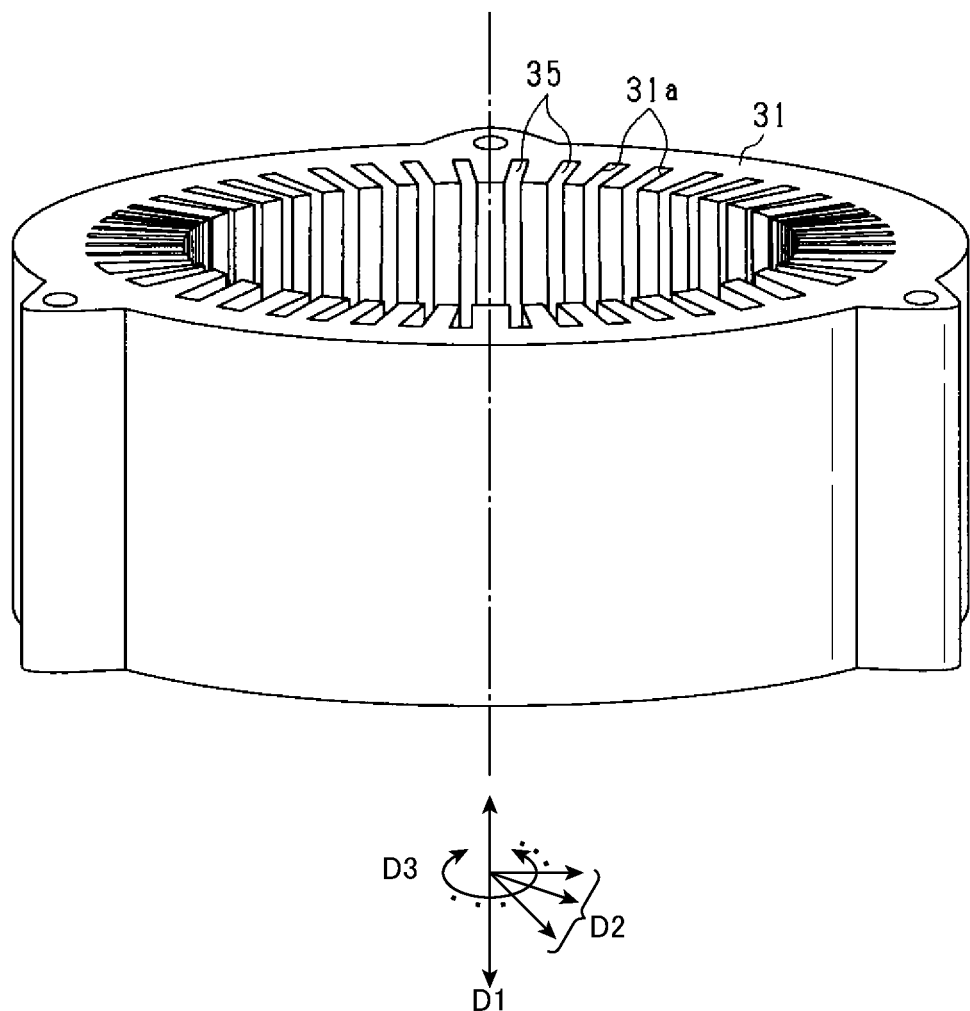
FIG. 3 is a perspective view of a stator core of the stator.
Figure 4:
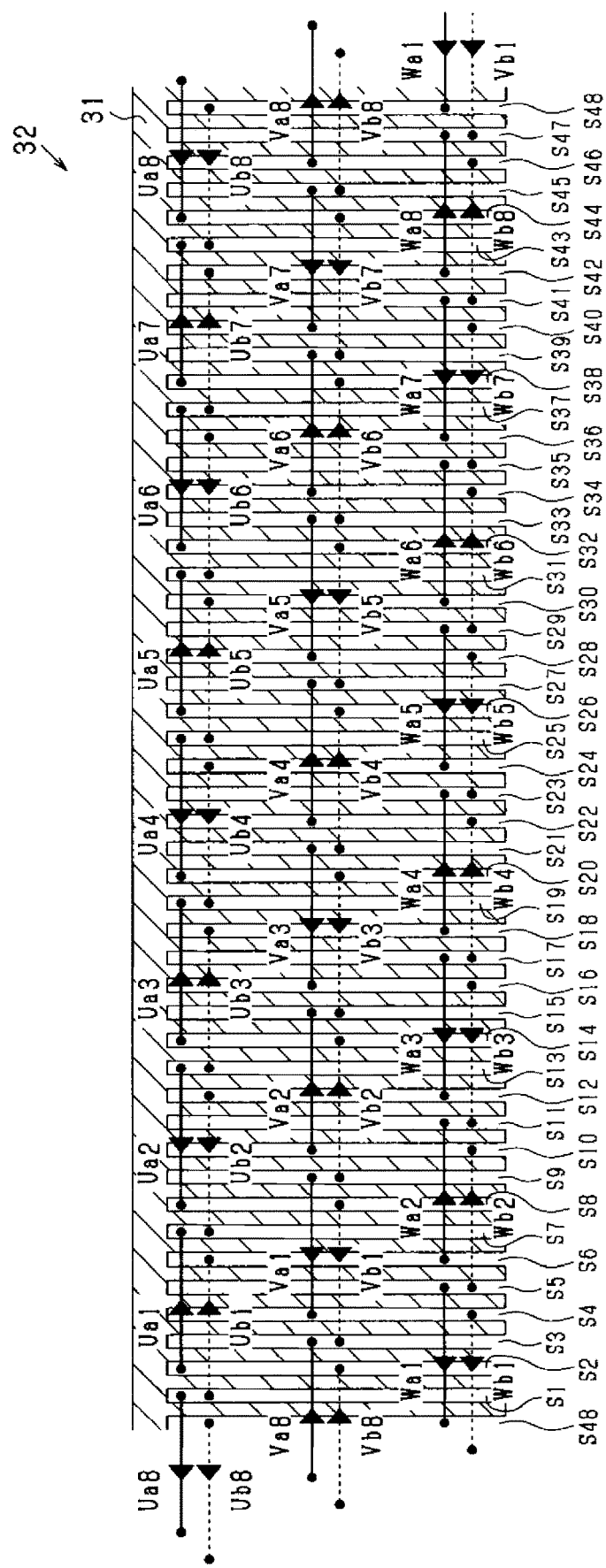
FIG. 4 is a winding diagram of circling coils of the stator winding.

Next, details of the stator 30 will be described. The stator core 31 is a laminated type in which thin steel plates are laminated. As shown in FIG. 3, a plurality of teeth 31a are provided on an inner circumferential surface of the stator core 31. A space that is partitioned by the teeth 31a serves as the slot 35. Therefore, a plurality of slots 35 are formed on the inner circumferential surface of the stator core 31. According to the present embodiment, forty-eight slots 35 are formed to house therein the stator winding 32 that includes three phase coils, in correspondence with the number of magnetic poles of the rotor 20. Hereafter, each of the forty-eight slots 35 is given a number for the purpose of description. That is, as shown in FIG. 4 and the like, the slots 35 are indicated as slot S1 to slot S48, in order in the circumferential direction D3.

Figure 5A:
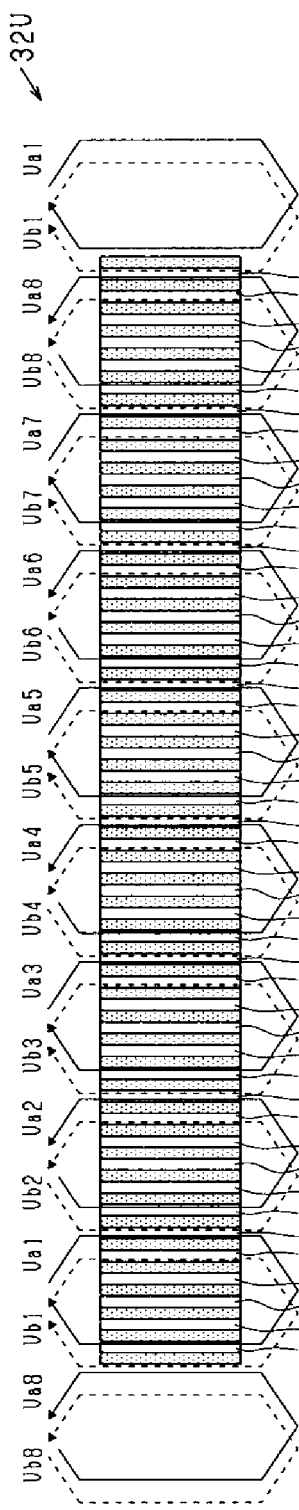
FIG. 5A to FIG. 5C are winding diagrams of the circling coils for each phase coil of the stator winding.
Figure 5B:
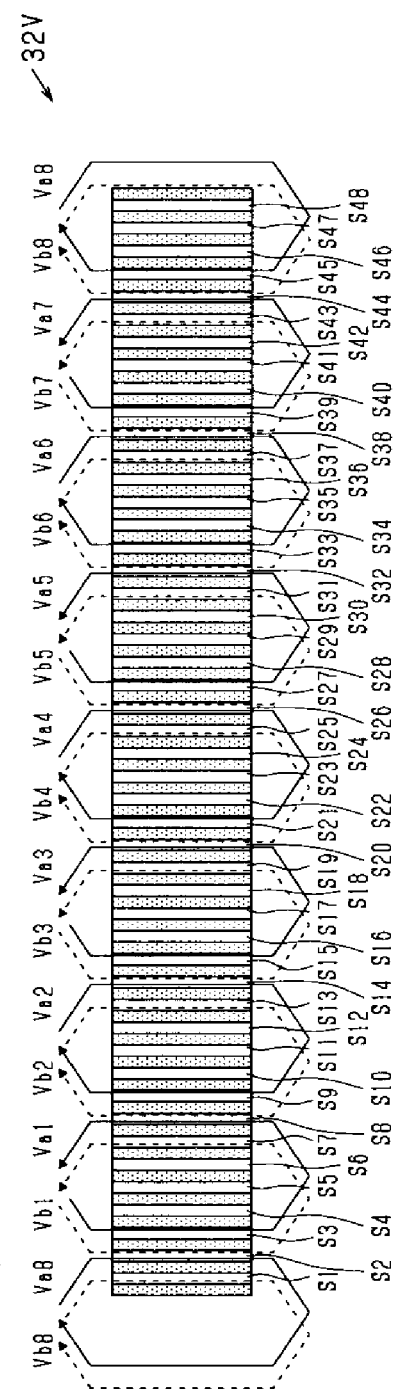
Figure 5C:
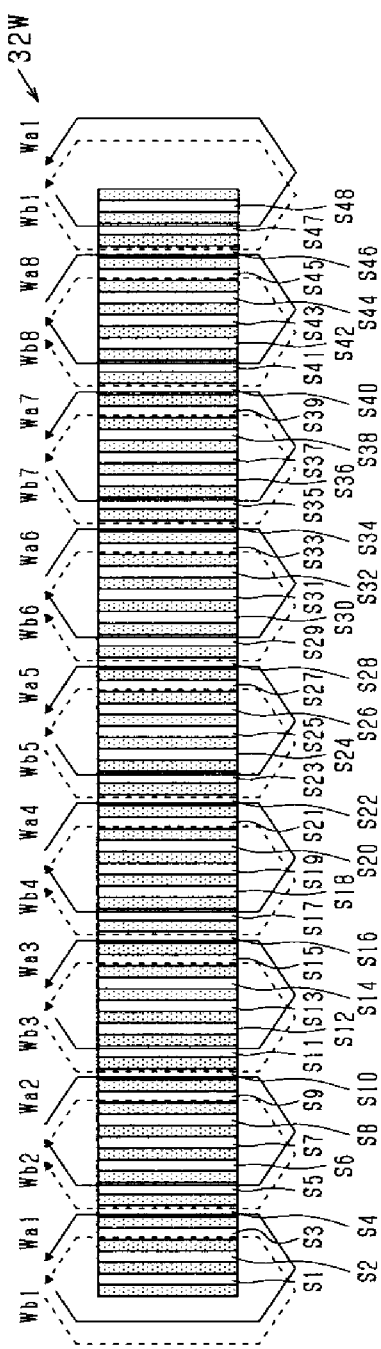

Next, the stator winding 32 will be described with reference to FIG. 4 and FIG. 5A to FIG. 5C. FIG. 4 and FIG. 5A to FIG. 5C are exploded views of the stator winding 32. FIG. 4 is an exploded view in which the stator 30 is exploded in the circumferential direction D3 and viewed from the axial direction D1. FIG. 4 shows positions of the slots 35 (slots S1 to S48) that house the circling coils. FIG. 5A to FIG. 5C are exploded views in which the stator 30 is exploded in the circumferential direction D3 and viewed from the radial direction D2. FIG. 5A shows the positions of the slots 35 (slots S1 to S48) that house the circling coils Ua1 to Ua8 and Ub1 to Ub8 of the U-phase coil 32U. FIG. 5B shows the positions of the slots 35 (slots S1 to S48) that house the circling coils Va1 to Va8 and Vb1 to Vb8 of the V-phase coil 32V. FIG. 5C shows the positions of the slots 35 (slots S1 to S48) that house the circling coils Wa1 to Wa8 and Wb1 to Wb8 of the W-phase coil 32W. Each of the arrows shown in FIG. 4 and FIG. 5A to FIG. 5C indicate a winding direction. A base end side of the arrow indicates a start of winding and a tip end side indicates an end of winding.

As shown in FIG. 4 and FIG. 5A to FIG. 5C, each of the phase coils 32U, 32V, and 32W of the stator winding 32 is formed by a lead wire that is a single, continuous wire being wound around the slots 35 by lap winding. According to the present embodiment, the circling coils Ua1 to Ua8, Ub1 to Ub8, Va1 to Va8, Vb1 to Vb8, Wa1 to Wa8, and Wb1 to Wb8 are provided so as to be spaced at a predetermined magnetic pole pitch (amounting to five slots, according to the present embodiment). The phase coils 32U, 32V, and 32W are provided so as to substantially make two rounds around the stator core 31 in a predetermined direction (such as a clockwise direction). That is, each of the phase coils 32U, 32V, and 32W is provided so as to overlap in two layers, that is, inner and outer layers in the radial direction D2.

In addition, when the circling coils Ub1 to Ub8 that serve as a second round are provided after the circling coils Ua1 to Ua8 are provided so as to make a round around the stator core 31, the circling coils Ub1 to Ub8 are arranged so as to be shifted from the circling coils Ua1 to Ua8 by a single slot in the circumferential direction D3.

For example, the circling coil Ub1 is provided so as to be shifted from the circling coil Ua1 by a single slot in a counter-clockwise direction (leftward direction in FIG. 4). The circling coils Ub2 to Ub8 are also similarly provided so as to be respectively shifted from the circling coils Ua2 to Ua8 by a single slot in the counter-clockwise direction. This similarly applies to the V-phase coil 32V and the W-phase coil 32W, as well.

In addition, the circling coil Va1 of the V-phase coil 32V is provided so as to be shifted from the circling coil Ua1 of the U-phase coil 32U by two slots in the clockwise direction (rightward direction in FIG. 4). The circling coils Va2 to Va8 and Vb1 to Vb8 of the V-phase coil 32V are also similarly respectively shifted from the circling coils Ua2 to Ua8 and Ub1 to Ub8. Furthermore, a manner in which the circling coils Va1 to Va8 and Vb1 to Vb8 of the V-phase coil 32V are wound is reverse that of the circling coils Ua1 to Ua8 and Ub1 to Ub8 of the U-phase coil 32U. That is, polarities (directions of current) thereof are opposite.

Furthermore, the circling coil Wa1 of the W-phase coil 32W is provided so as to be shifted from the circling coil Ua1 of the U-phase coil 32U by two slots in the counter-clockwise direction (leftward direction in FIG. 4). The circling coils Wa2 to Wa8 and Wb1 to Wb8 of the W-phase coil 32W are also similarly respectively shifted from the circling coils Ua2 to Ua8 and Ub1 to Ub8. Moreover, the manner in which the circling coils Wa1 to Wa8 and Wb1 to Wb8 of the W-phase coil 32W are wound is reverse that of the circling coils Ua1 to Ua8 and Ub1 to Ub8 of the U-phase coil 32U. That is, the polarities (directions of current) thereof are opposite.

As a result of the above-described configuration, the circling coils Ua1 to Ua8, Ub1 to Ub8, Va1 to Va8, Vb1 to Vb8, Wa1 to Wa8, and Wb1 to Wb8 are housed in the slots 35 such that two circling coils are housed in each slot 35. That is, in each slot 35, the lead wire is housed so as to form two layers on an inner side and an outer side in the radial direction D2.

For example, the circling coil Ua1 of the U-phase coil 32U is formed so as to be wound between the second slot S2 and the seventh slot S7, from the second slot S2 towards the seventh slot S7. In a similar manner, the circling coil Ua2 of the U-phase coil 32U is formed so as to be wound between the eighth slot S8 and the thirteenth slot S13, from the thirteenth slot S13 towards the eighth slot S8.

In a similar manner, the circling coil Ub1 of the U-phase coil 32U is formed so as to be wound between the first slot S1 and the sixth slot S6, from the first slot S1 towards the sixth slot S6. In a similar manner, the circling coil Ub2 of the U-phase coil 32U is formed so as to be wound between the seventh slot S and the twelfth slot S12, from the twelfth slot S12 towards the seventh slot S7.

In a similar manner, the circling coil Vb1 of the V-phase coil 32V is formed so as to be wound between the third slot S3 and the eighth slot S8, from the eighth slot S8 towards the third slot S3. In a similar manner, the circling coil Wa2 of the W-phase coil 32W is formed so as to be wound between the sixth slot S6 and the eleventh slot S11, from the sixth slot S6 towards the eleventh slot S11.

Therefore, the circling coil Ua1 and the circling coil Ub2 of the U-phase coil 32U are housed in the seventh slot S7. In addition, the circling coil Ub1 of the U-phase coil 32U and the circling coil Wa2 of the W-phase coil 32W are housed in the sixth slot S6. Furthermore, the circling coil Ua2 of the U-phase coil 32U and the circling coil Vb1 of the V-phase coil 32V are housed in the eighth slot S8.

As a result of the foregoing, one terminal-side coil among terminal-side coils Ua1 to Ua8, Va1 to Va8, and Wa1 to Wa8 of a first phase coil among the phase coils 32U, 32V and 32W and one neutral-point-side coil among neutral-point-side coils Ub1 to Ub8, Vb1 to Vb8, and Wb1 to Wb8 of the first phase coil are housed in each of the odd-numbered slots S1, S3, S5, ..., S47 (corresponding to a second slot). Here, the terminal-side coils Ua1 to Ua8, Va1 to Va8, and Wa1 to Wa8 are the circling coils of the phase coils 32U, 32V, and 32W that are further towards the external-terminal side than an intermediate point M, and may be referred to as terminal-side coils Ua, Va, and Wa. In addition, the neutral-point-side coils Ub1 to Ub8, Vb1 to Vb8, and Wb1 to Wb8 are the circling coils of the phase coils 32U, 32V and 32W that are further towards the neutral-point side than the intermediate point M, and may be referred to as neutral-point-side coils Ub, Vb, and Wb.

Meanwhile, one terminal-side coil Ua, Va, or Wa of the first phase coil that is determined in advance among the phase coils 32U, 32V, and 32W and one neutral-point-side coil Ub, Vb, or Wb of a second phase coil that is different in phase from the first phase coil are housed in each of the even-number slots S2, S4, S6, ..., S48 (corresponding to a first slot).

In addition, in the stator 30, there is no slot 35 in which a terminal-side coil Ua, Va, or Wa of the first phase coil and a terminal-side coil Ua, Va, or Wa of the second phase coil are housed together. In a similar manner, there is no slot 35 in which a neutral-point-side coil Ub, Vb, or Wb of the first phase coil and a neutral-point-side coil Ub, Vb, or Wb of the second phase coil are housed together. That is, there is no slot in which two or more terminal-side coils Ua, Va, and Wa are housed. In a similar manner, there is no slot in which two or more neutral-point-side coils Ub, Vb, and Wb are housed.

As a result of the foregoing, in one of first slots on both sides of an odd-numbered slot 35 in the circumferential direction D3, the terminal-side coil Ua, Va, or Wa of the first phase coil and the neutral-point-side coil Ub, Vb, or Wb of the second phase coil are housed. In addition, in the other of first slots on both sides of an odd-numbered slot 35 in the circumferential direction D3, the neutral-point-side coil Ub, Vb, or Wb of the first phase coil and the terminal-side coil Ua, Va, or Wa of a third phase coil are housed. The third phase coil differs from the first phase coil and the second phase coil. For example, in the slot S8 that is the slot on one of both sides of the seventh slot S7 in the circumferential direction D3, the terminal-side coil Ua2 of the U-phase coil 32U and the neutral-point-side coil Vb1 of the V-phase coil 32V are housed. In addition, in the slot S6 that is the slot on the other side, the neutral-point-side coil Ub1 of the U-phase coil 32U and the terminal-side coil Wa2 of the W-phase coil 32W are housed.

In addition, as a result of the above-described configuration, the terminal-side coil Ua, Va, or Wa of the first phase coil that is determined in advance among the phase coils 32U, 32V, and 32W is housed together with the neutral-point-side coil Ub, Vb, or Wb of the second phase coil in the first slot that is determined in advance among the slots 35. Meanwhile, the terminal-side coil Ua, Va, or Wa of the first phase coil is housed together with the neutral-point-side coil Ub, Vb, or Wb of the first phase coil in the second slot. For example, the circling coil Ua1 of the U-phase coil 32U is housed together with the circling coil Vb8 of the V-phase coil 32V in the second slot S2 (corresponding to the first slot). In addition, the circling coil Ua1 of the U-phase coil 32U is housed together with the circling coil Ub2 of the U-phase coil 32U in the seventh slot S7 (corresponding to the second slot).

Here, the phase coils 32U, 32V, and 32W are each provided through use of a continuous wire. However, the phase coils 32U, 32V and 32W may be provided by conductor segments being inserted into the slots 35 and end portions of the conductor segments being connected. The conductor segment is that in which an electrical conductor that has a substantially rectangular cross-section (straight angle cross-section) and a fixed thickness is formed to be substantially U-shaped.

Figure 6:
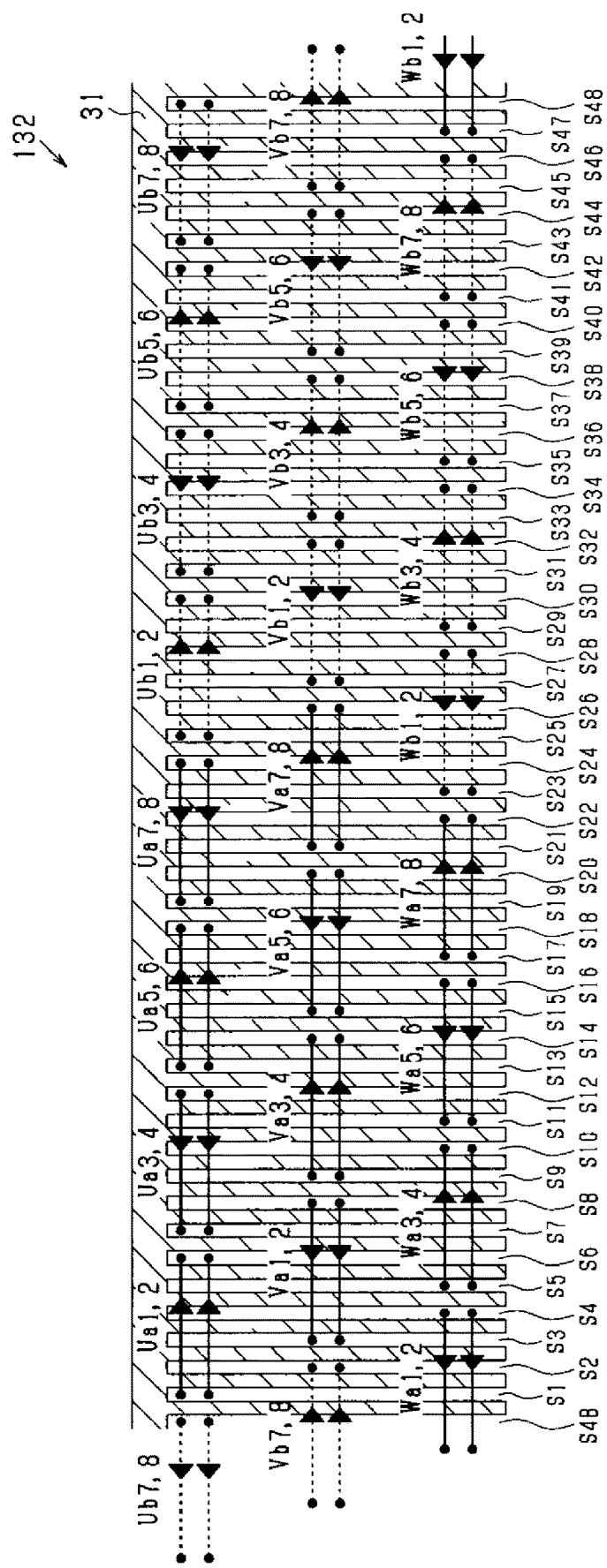
FIG. 6 is a winding diagram of the circling coils in a conventional configuration.

Next, a surge voltage that is generated at the instant a voltage is applied to the stator winding 32 from the external terminal 320U via the inverter 41 in the drive motor 10 configured as described above will be described. First, a stator winding 132 of a drive motor that has a conventional configuration and serves as a comparison for the drive motor 10 of the above-described configuration will be described. At this time, differences with the above-described configuration will mainly be described. FIG. 6 and FIG. 7 are exploded views of the stator winding 132 of the conventional configuration. FIG. 6 is an exploded view in which the stator 30 is exploded in the circumferential direction D3 and viewed from the axial direction D1, in a manner similar to FIG. 4. FIG. 7 is an exploded view in which the stator 30 is exploded in the circumferential direction D3 and viewed from the radial direction D2, in a manner similar to FIG. 5.

As shown in FIG. 6 and FIG. 7, each of the phase coils 132U, 132V, and 132W of the stator winding 132 is formed such that a lead wire that is a single continuous wire is wound around the slots 35 by lap winding. In the stator winding 132 of the conventional configuration, the circling coils Ua1 to Ua8, Ub1 to Ub8, Va1 to Va8, Vb1 to Vb8, Wa1 to Wa8, and Wb1 to Wb8 are provided so as to be spaced at a predetermined magnetic pole pitch (amounting to five slots).

In addition, in the conventional configuration, unlike that in the stator winding 32 described above, the circling coil Ua1 and the circling coil Ua2 are provided between the same slots 35 (between the first slot S1 and the sixth slot S6). This similarly applies to the other circling coils Ua3 to Ua8 and Ub1 to Ub8 in the U-phase coil 132U. In addition, this similarly applies to the V-phase coil 132V and the W-phase coil 132W.

As a result of the above-described configuration, a terminal-side coil Ua(X+1) of the U-phase coil 132U is housed in the slot 35 (slot S1, S6, S7, S12, S13, S18, S19, or S24) in which the terminal-side coil Ua(X) of the U-phase coil 132 is housed. Here, (X) is any of 1, 3, 5, and 7, and (X+1) is any of 2, 4, 6, and 8.

In addition, the neutral-point-side coil Ub(X+1) of the U-phase coil 132 is housed in the slot 35 (slot S25, S30, S31, S36, S37, S42, S43, or S48) in which the neutral-point-side coil Ub(X) of the U-phase coil 132U is housed. This similarly applies to the slots 35 in which the V-phase coil 132V and the W-phase coil 132W are housed.

Here, a potential difference between the U-phase coil 132U and the V-phase coil 132V from when the upper-arm switches Sp of the phase coils 132U, 132V, and 132W are in the ON state until the instant in which the lower-arm switches Sn of the V-phase coil 132V and the W-phase coil 132W enter the ON state will be described. First, the potential difference in the stator winding 132 of the conventional configuration will be described.

In the stator winding 132 of the conventional configuration, at the instant in which the lower-arm switches Sn of the V-phase coil 132V and the W-phase coil 132W enter the ON state, resonance phenomenon occurs as a result of high-frequency components that are included in the voltage (square-wave voltage) that is applied based on switching.

Figure 8:
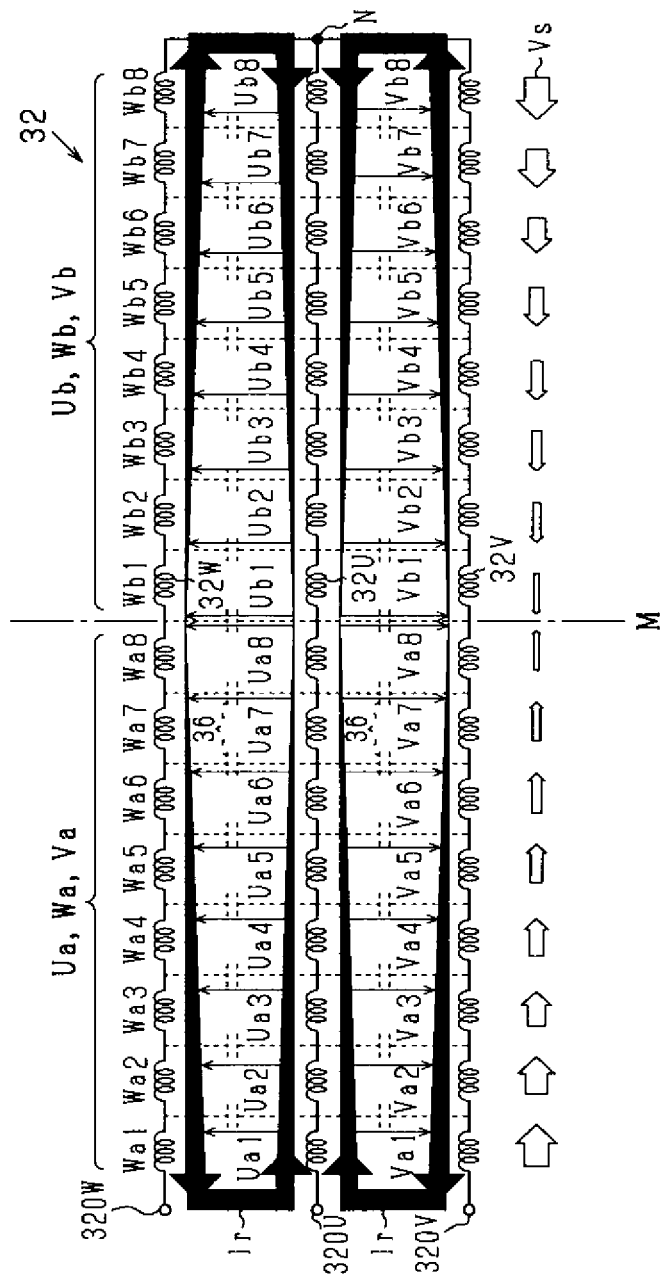
FIG. 8 is a diagram of a resonance current and a surge voltage in the conventional configuration.

That is, as shown in FIG. 8, stray capacitance 36 is present between adjacent circling coils. Here, stray capacitance is also present between the circling coils and the stator core 31. However, this stray capacitance is omitted in FIG. 8. Therefore, at the instant in which switching by the inverter 41 is performed, a resonance current Ir (surge current) flows to each circling coil via the stray capacitance 36, and the resonance phenomenon occurs. Here, a direction of the arrow in FIG. 8 indicates a direction of the resonance current Ir. A thickness of the arrow indicates a magnitude of the resonance current Ir.

At this time, symmetrical resonance currents Ir are known to flow between the terminal-side coils Ua, Va, and Wa, and the neutral-point-side coils Ub, Vb, and Wb. That is, the direction in which the resonance current Ir that flows to the terminal-side coils Ua, Va, and Wa flows and the direction in which the resonance current Ir that flows to the neutral-point-side coils Ub, Vb, and Wb flows are opposite. In addition, the resonance current Ir increases as the circling coil becomes closer to the external terminals (320U, 320V, and 320W) or the neutral point N. The resonance current Ir decreases as the circling coil becomes closer to the intermediate point M.

Figure 9:
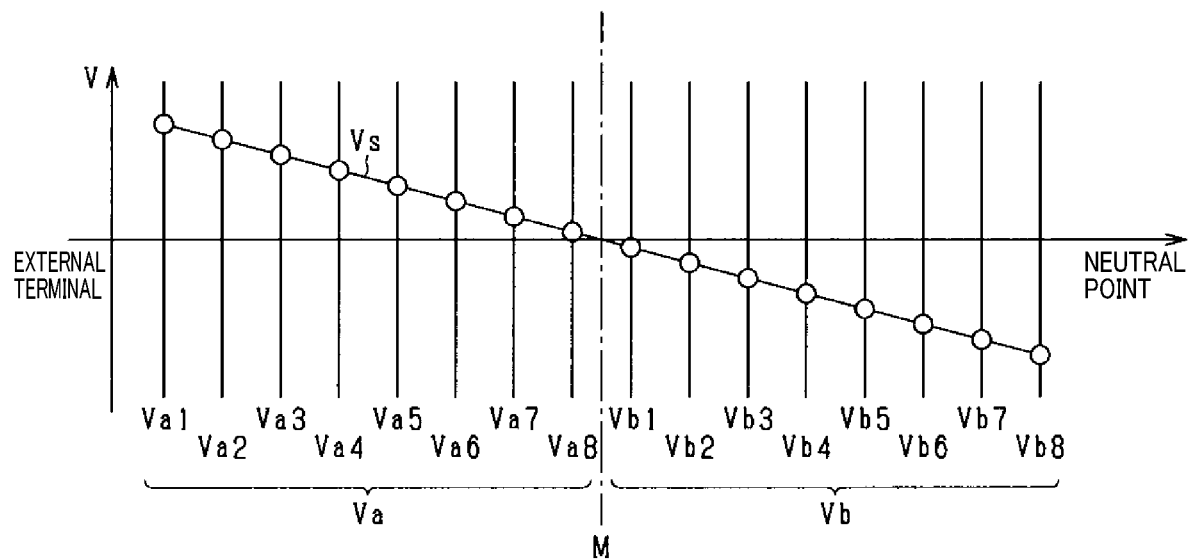
FIG. 9 is a diagram of the surge voltage in the conventional configuration.

Therefore, as shown in FIG. 8 and FIG. 9, in the phase coils 32U, 32V and 32W, a surge voltage Vs that is generated in a circling coil that is near the external terminals 320U, 320V, and 320W or the neutral point N is greater than a surge voltage Vs that is generated in a circling coil that is near the intermediate point M. Here, because the directions of the resonance currents Ir differ, the polarities of the surge voltage Vs of the terminal-side coils Ua, Va, and Wa and the surge voltage Vs of the neutral-point-side coils Ub, Vb, and Wb differ. In FIG. 8, the direction (polarity and direction of application) of the surge voltage Vs that is generated in each of the circling coils Va1 to Va8 and Vb1 to Vb8 is indicated by the direction of the arrow. The magnitude of the surge voltage Vs is indicated by the thickness of the arrow. In addition, in FIG. 9, the surge voltages Vs that are generated in the circling coils Va1 to Va8 and Vb1 to VB8 are indicated by a solid line. Here, the direction of the surge voltage Vs that is generated in each of the circling coils Ua1 to Ua8 and Ub1 to Ub8 of the U-phase coil 32U is opposite the direction of the surge voltage Vs that is generated in each of the circling coils Va1 to Va8 and Vb1 to Vb8.

Figure 10:
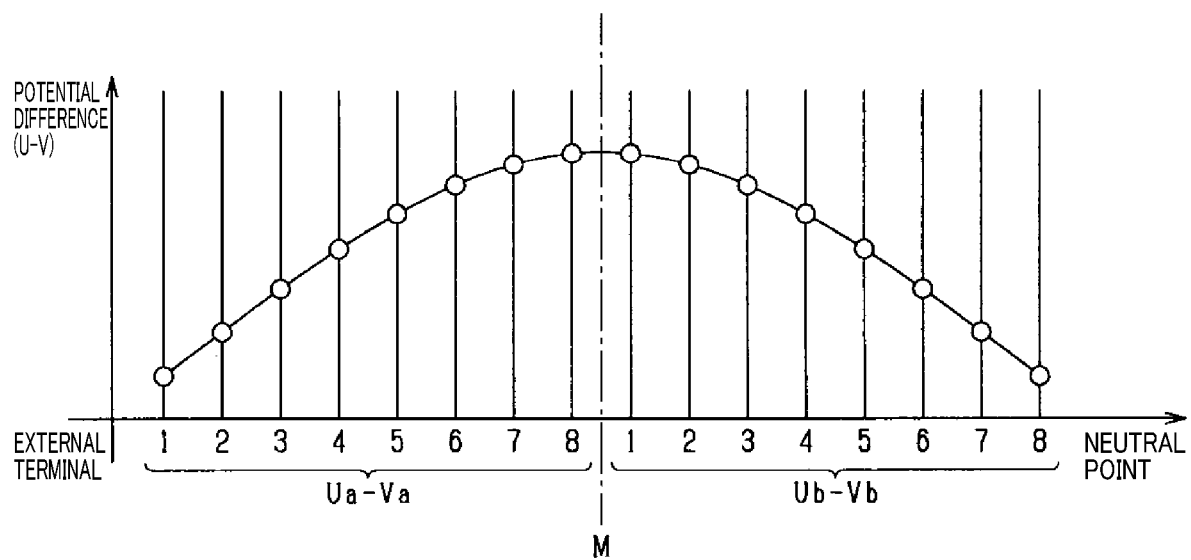
FIG. 10 is a diagram of a potential difference between a U-phase and a V-phase in the conventional configuration.

In this case, the potential difference between the U-phase coil 132U and the V-phase coil 132V can be calculated by a total sum of the surge voltage Vs of each circling coil shown in FIG. 8 and FIG. 9 being added via the neutral point N. The potential difference between the U-phase coil 132U and the V-phase coil 132V is as shown in FIG. 10. As shown in FIG. 10, in the stator winding 132 of the conventional configuration, the potential difference between the U-phase coil 132U and the V-phase coil 132V is maximum at the intermediate point M.

Next, the potential difference of the stator winding 32 according to the present embodiment will be described. In the stator 30 according to the present embodiment as well, the resonance current Ir such as that shown in FIG. 11 flows at the instant in which switching is performed, based on principles similar to that of the conventional configuration. In addition, the surge voltages Vs such as those indicated by solid-line arrows in FIG. 11 and a broken line in FIG. 12 are generated in the circling coils.

However, in the stator 30 according to the present embodiment, the neutral-point-side coils Ub of the U-phase coil 32U are housed in the slots S1, S7, S13, S19, S25, S31, S37, and S43 in which the terminal-side coils Ua of the U-phase coil 32U are housed. Therefore, magnetic coupling occurs between the terminal-side coils Ua and the neutral-point-side coils Ub. That is, an induced voltage Vi(Ub) that is generated as a result of the resonance current Ir of the neutral-point-side coils Ub is generated in the terminal-side coils Ua. In addition, the direction in which the resonance current Ir of the terminal-side coils Ua flows is opposite that of the resonance current Ir of the neutral-point-side coils Ub. Therefore, as a result of mutual magnetic inductance, when the inductance voltage Vi(Ub) based on the resonance current Ir of the neutral-point-side coils Ub is generated, a surge voltage Vs(Ua) of the terminal-side coils Ua is reduced. That is, the induced voltage Vi(Ub) is subtracted from the surge voltage Vs(Ua) of the terminal-side coils Ua. Here, an inverse relationship is also established. A surge voltage Vs(Ub) based on the neutral-point-side coils Ub is reduced as a result of an induced voltage Vi(Ua) of the terminal-side coils Ua.

For example, according to the present embodiment, the neutral-point-side coil Ub2 of the U-phase coil 32U is housed in the second slot S2 in which the terminal-side coil Ua1 of the U-phase coil 32U is housed. Therefore, magnetic coupling occurs between the terminal-side coil Ua1 and the neutral-point-side coil Ub2. That is, the induced voltage Vi(Ub2) that is generated as a result of the neutral-point-side coil Ub2 is generated in the terminal-side coil Ua1. Therefore, the surge voltage Vs(Ua1) of the terminal-side coil Ua1 is reduced by the induced voltage Vi(Ub2) based on the neutral-point-side coil Ub2.

In a similar manner, the neutral-point-side coils Vb of the V-phase coil 32V are housed in the slots S3, S9, S15, S21, S27, S33, S39, and S45 in which the terminal-side coils Va of the V-phase coil 32V are housed. Therefore, in a manner similar to that in the U-phase coil 32U, the surge voltage Vs(Va) of the terminal-side coils Va is reduced by the induced voltage Vi(Vb). Here, an inverse relationship is also established.

In a similar manner, the neutral-point-side coils Wb of the W-phase coil 32W are housed in the slots S5, S11, S17, S23, S29, S35, S41, and S47 in which the terminal-side coils Wa of the W-phase coil 32W are housed. Therefore, in a manner similar to that in the U-phase coil 32U, the surge voltage Vs(Wa) of the terminal-side coils Wa is reduced by the induced voltage Vi(Wb). Here, an inverse relationship is also established.

Figure 11:
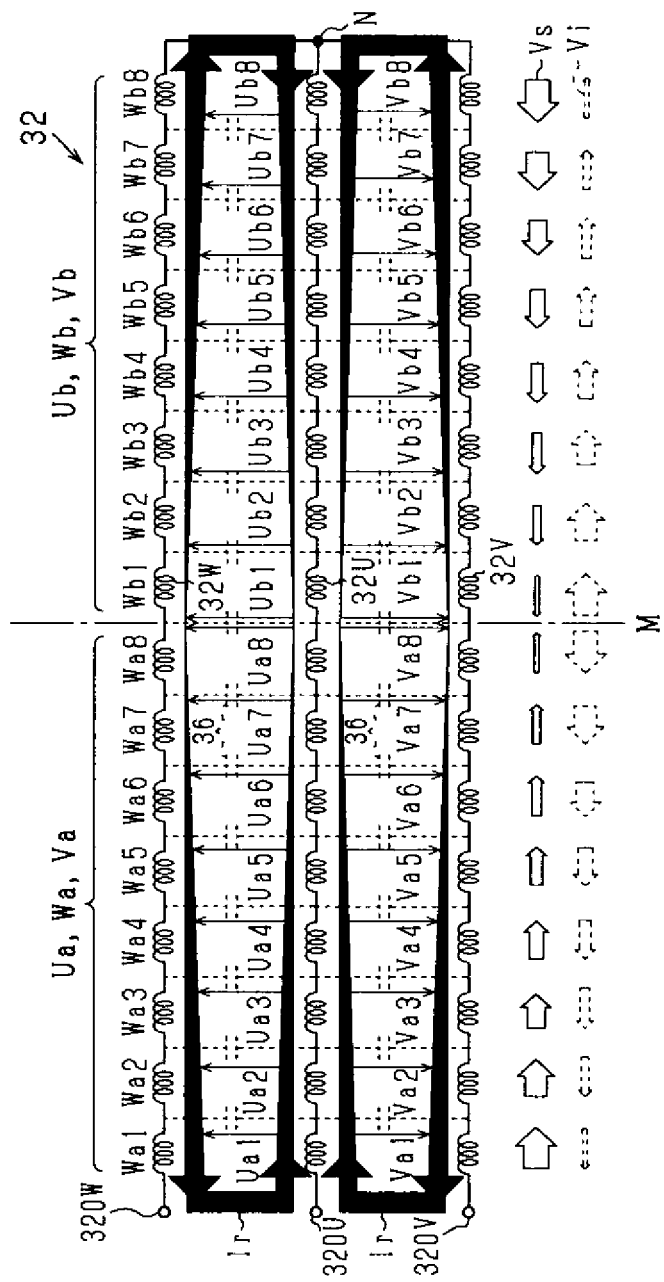
FIG. 11 is a diagram of the resonance current and the surge voltage in the first embodiment.
Figure 12:
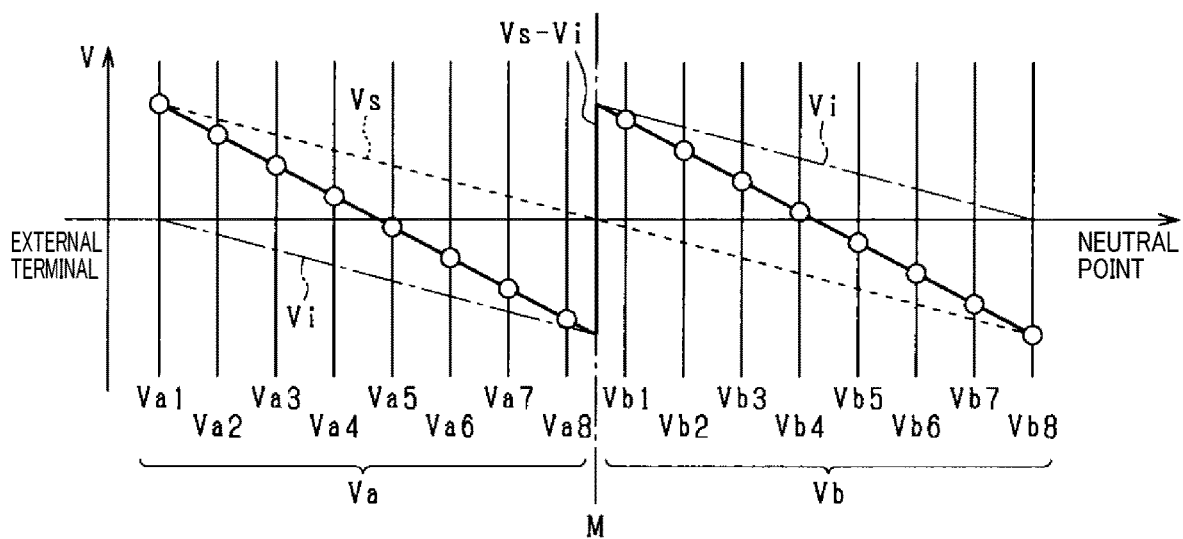
FIG. 12 is a diagram of the surge voltage in the first embodiment.

In FIG. 11, the directions and magnitudes of the induced voltages Vi(Va1 to Va8 and Vb1 to Vb8) of the circling coils Va1 to Va8 and Vb1 to Vb8 of the V-phase coil 32V are indicated by broken-line arrows. In addition, in FIG. 12, the surge voltages Vs(Va1 to Va8 and Vb1 to Vb8) of the circling coils Va1 to Va8 and Vb1 to Vb8 of the V-phase coil 32V are indicated by a broken line. Furthermore, the induced voltages Vi(Va1 to Va8 and Vb1 to Vb8) of the circling coils Va1 to Va8 and Vb1 to Vb8 of the V-phase coil 32V are indicated by a single-dot chain line. Moreover, final surge voltages (Vs-Vi) of the circling coils Va1 to Va8 and Vb1 to Vb8 are indicated by a solid line. Here, in FIG. 12, the surge voltages Vs of the V-phase coil 32V are shown. However, this similarly applies to the surge voltages Vs of the U-phase coil 32U and the W-phase coil 32W.

Figure 13:
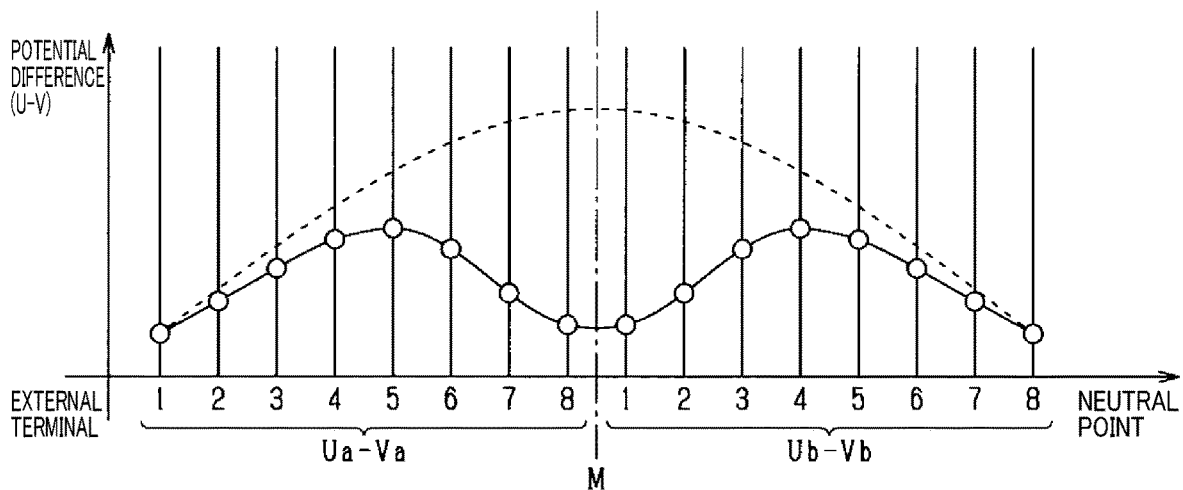
FIG. 13 is a diagram of the potential difference between the U-phase and the V-phase in the first embodiment.
Figure 14:
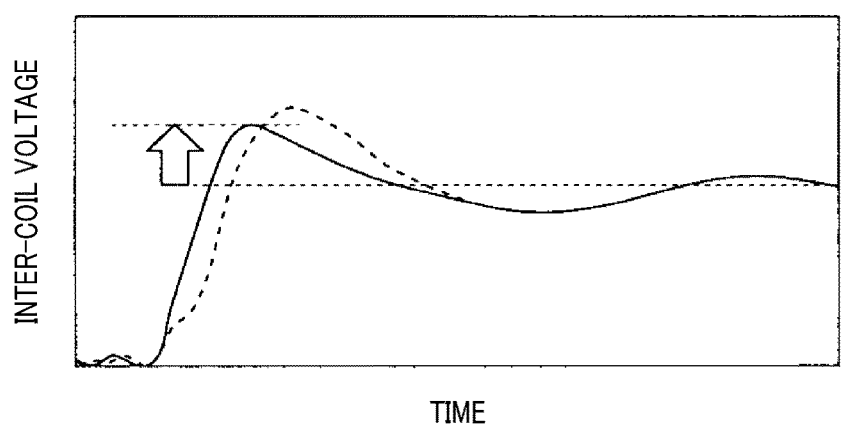
FIG. 14 is a diagram showing behavior of the surge voltage against time in the conventional configuration and the first embodiment.

Therefore, taking into consideration the reduction effect caused by the induced voltages Vi of the circling coils Va1 to Va8 and Vb1 to Vb8, the potential difference between the U-phase coil 32U and the V-phase coil 32V is as indicated by a solid line in FIG. 13. As indicated by the solid line in FIG. 13, the potential difference is maximum between the circling coil Ua4 and the circling coil Ua5, and between the circling coil Ub4 and the circling coil Ub5. Therefore, as shown in FIG. 14, in the stator 30 of the present configuration (solid line), the effects of the surge voltage during switching are reduced, compared to that in the conventional configuration (broken line).

In addition, in the stator winding 32 according to the present embodiment, the neutral-point-side coils Vb of the V-phase coil 32V are housed in the slots S2, S8, S14, S20, S26, S32, S38, and S44 in which the terminal-side coils Ua of the U-phase coil 32U are housed. Therefore, magnetic coupling occurs between the terminal-side coils Ua and the neutral-point-side coils Vb. That is, the induced voltage Vi(Vb) based on the resonance current Ir of the neutral-point-side coil Vb is generated in the terminal-side coil Ua. In addition, the manner in which the terminal-side coils Ua are wound (current direction) is opposite that of the neutral-point-side coils Vb. Therefore, as a result of mutual magnetic induction, when the induced voltage Vi(Vb) based on the resonance current Ir of the neutral-point-side coil Vb is generated in the terminal-side coil Ua, the surge voltage Vs(Ua) of the terminal-side coil Ua is reduced. That is, the induced voltage Vi(Ub) and the induced voltage Vi(Vb) are ultimately subtracted from the surge voltage Vs(Ua) of the terminal-side coil. Here, an inverse relationship is also established. The surge voltage Vs(Vb) based on the neutral-point-side coil Vb is reduced by the induced voltage Vi(Ua) generated as a result of the terminal-side coil Ua.

For example, the neutral-point-side coil Vb8 of the V-phase coil 32V is housed in the second slot S2 in which the terminal-side coil Ua1 of the U-phase coil 32U is housed. Therefore, when mutual magnetic induction occurs, the surge voltage Vs(Ua1) of the terminal-side coil Ua1 is reduced by the induced voltage Vi(Vb8) based on the neutral-point-side coil Vb2.

In addition, a similar phenomenon occurs in the slots S6, S12, S18, S24, S30, S36, S42, and S48 in which the terminal-side coils Wa of the W-phase coil 32W and the neutral-point-side coils Ub of the U-phase coil 32U are housed. That is, the surge voltage Vs(Ub) of the neutral-point-side coil Ub is reduced by the induced voltage Vi(Wa) that is generated as a result of the terminal-side coil Wa. In addition, the surge voltage Vs(Wa) of the terminal-side coil Wa is reduced by the induced voltage Vi(Ub) that is generated as a result of the neutral-point-side coil Ub.

Therefore, the surge voltage Vs(Ua) of the terminal-side coil Ua of the U-phase coil 32U is ultimately reduced by the induced voltage Vi(Ub) based on the neutral-point-side coil Ub, in the slots S1, S7, S13, S19, S25, S31, S37, and S43. The surge voltage Vs(Ua) of the terminal-side coil Ua of the U-phase coil 32U is further reduced by the induced voltage Vi(Vb) based on the neutral-point-side coil Vb, in the slots S2, S8, S14, S20, S26, S32, S38, and S44.

For example, the surge voltage Vs(Ua1) of the terminal-side coil Ua1 is ultimately reduced by the induced voltage Vi(Ub2) based on the neutral-point-side coil Ub2 in the slot S7. The surge voltage Vs(Ua1) of the terminal-side coil Ua1 is further reduced by the induced voltage Vi(Vb8) based on the neutral-point-side coil Vb8 in the slot S2.

In addition, the surge voltage Vs(Ub) of the neutral-point-side coil Ub of the U-phase coil 32U is ultimately reduced by the induced voltage Vi(Ua) based on the terminal-side coil Ua, in the slots S1, S7, S13, S19, S25, S31, S37, and S43. The surge voltage Vs(Ub) of the neutral-point-side coil Ub of the U-phase coil 32U is further reduced by the induced voltage Vi(Wa) based on the neutral-point-side coil Wa, in the slots S6, S12, S18, S24, S30, S36, S42, and S48.

For example, the surge voltage Vs(Ub1) of the neutral-point-side coil Ub1 is ultimately reduced by the induced voltage Vi(Ua8) based on the terminal-side coil Ua8 in the slot S1. The surge voltage Vs(Ub1) of the neutral-point-side coil Ub1 is further reduced by the induced voltage Vi(Wa2) based on the terminal-side coil Wa2 in the slot S6.

Here, the terminal-side coils Va and the neutral-point-side coils Wb are housed in the slots S4, S10, S16, S22, S28, S34, S40, and S46. Therefore, magnetic coupling may also occur between the terminal-side coils Va and the neutral-point-side coils Wb. The induced voltage may be generated. In addition, the direction of the resonance current Ir is the same between the terminal-side coils Va and the neutral-point-side coils Wb. Therefore, the reduction effect is not obtained, and the relationship is such that the induced voltage Vi is superimposed.

However, as described above, the neutral-point-side coils Vb are housed in the slots S3, S9, S15, S21, S27, S33, S39, and S45 in which the terminal-side coils Va are housed. Therefore, in the terminal-side coil Va, the induced voltage Vi(Wb) based on the neutral-point-side coil Wb is canceled out by the induced voltage Vi(Vb) based on the neutral-point-side coil Vb. Therefore, the surge voltage Vs(Va) of the terminal-side coil Va is ultimately unchanged from the surge voltage in the conventional configuration.

Advantageous effects obtained by the above-described configuration will be described.

When a square-wave voltage is applied to the stator winding 32 as a result of switching or the like, resonance phenomenon occurs as a result of the high-frequency components of the square-wave voltage. Here, the neutral-point-side coils Vb of the V-phase coil 32V are housed in the slots S2, S8, S14, S20, S26, S32, S38, and S44 that house the terminal-side coils Ua of the U-phase coil 32U. The U-phase coil 32U serves as the first phase coil. The V-phase coil 32V serves as the second phase coil. The slots S2, S8, S14, S20, S26, S32, S38, and S44 serve as the first slot. At this time, the resonance current Ir that flows to the terminal-side coils Ua and the resonance current Ir that flows to the neutral-point-side coils Vb are in opposite directions. As a result, mutual magnetic induction can be generated between the terminal-side coils Ua and the neutral-point-side coils Vb. The surge voltage Vs(Ua) that is generated in each circling coil can be reduced by the induced voltage Vi(Vb). Therefore, the maximum interphase voltage can be suppressed.

The neutral-point-side coils Ub of the U-phase coil 32U are housed in the slots S1, S7, S13, S19, S25, S31, S37, and S43 in which the terminal-side coils Ua of the U-phase coil 32U are housed. The slots S1, S7, S13, S19, S25, S31, S37, and S43 serve as the second slot. As a result, mutual magnetic induction occurs between the terminal-side coils Ua and the neutral-point-side coils Ub of the U-phase coil 32U. The surge voltage Vs that is generated in each circling coil can be reduced. Therefore, the maximum interphase voltage can be suppressed.

The direction of the resonance current Ir is the same between the terminal-side coils Ua of the U-phase coil 32U and the terminal-side coils Va or Wa of the V-phase coil 32V or the W-phase coil 32W. Therefore, when mutual inductance occurs, the surge voltage Vs is likely to increase. Here, a slot 35 in which the terminal-side coil Ua, Va, or Wa of the first phase coil and the terminal-side coil Ua, Va, or Wa of the second phase coil are housed together is not present among the slots 35. In a similar manner, a slot 35 in which the neutral-point-side coil Ub, Vb, or Wb of the first phase coil and the neutral-point-side coil Ub, Vb, or Wb of the second phase coil are housed together is not present among the slots 35. As a result, increase in the maximum interphase voltage is prevented.

Second Embodiment

Next, the drive motor 10 according to a second embodiment will be described. Sections among the embodiments that are identical or equivalent are given the same reference numbers below. Descriptions of sections having the same reference numbers are applicable therebetween.

Figure 15:
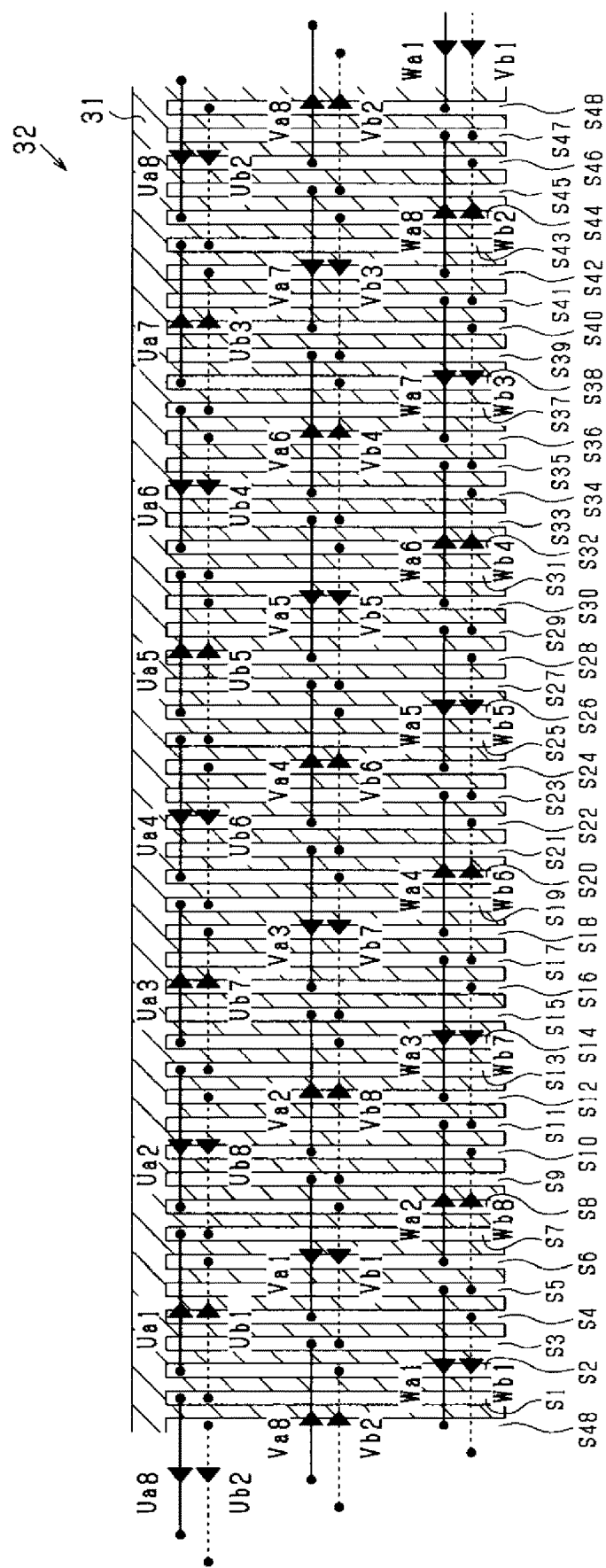
FIG. 15 is a winding diagram of the circling coils according to a second embodiment.
Figures 16A, 16B, 16C:
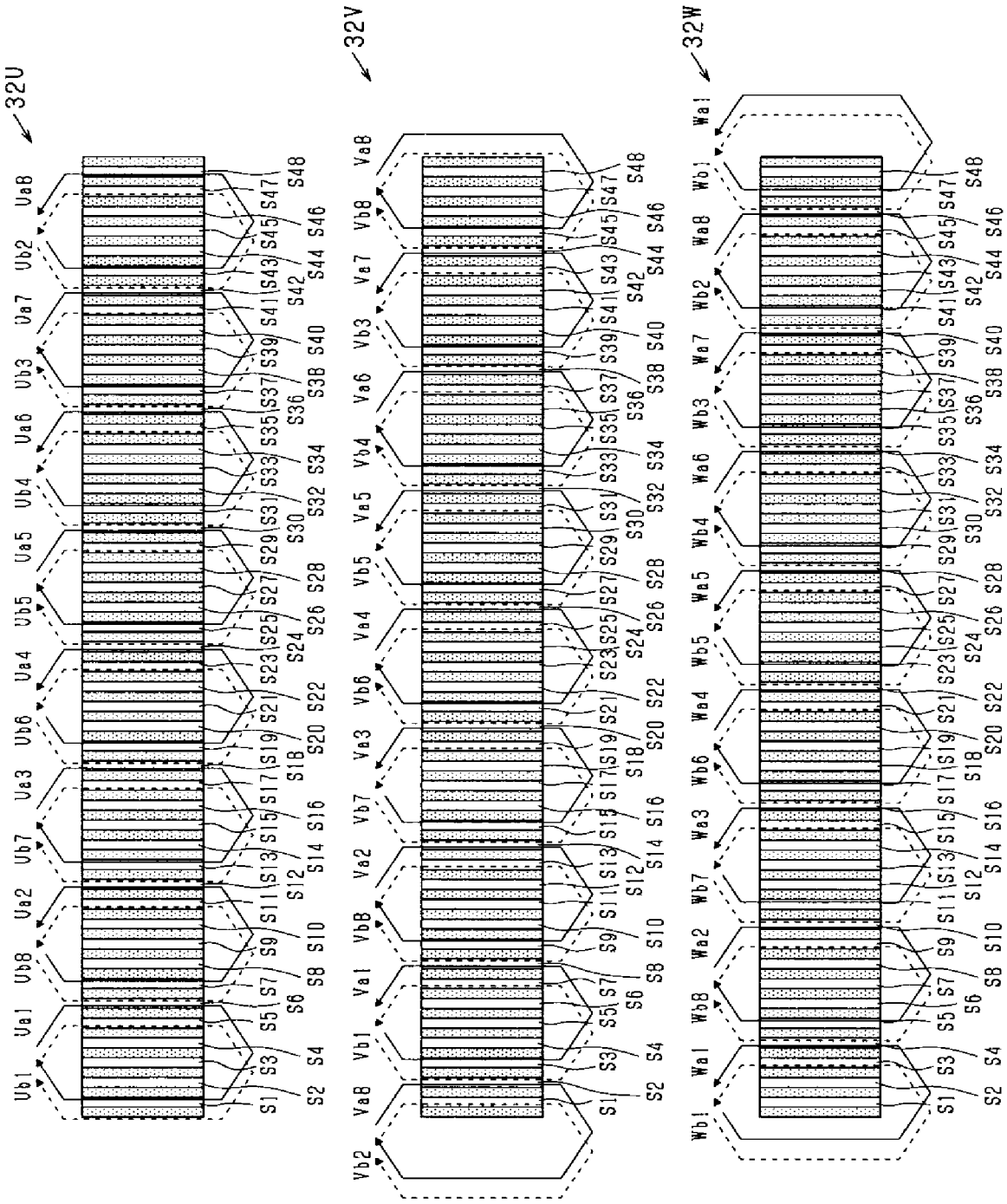
FIG. 16A to FIG. 16C are winding diagrams of the circling coils for each phase coil in the second embodiment.

The stator winding 32 according to the second embodiment will be described, mainly focusing on differences with those according to the first embodiment. The stator winding 32 according to the second embodiment will be described with reference to FIG. 15 and FIG. 16. FIG. 15 is an exploded view in which the stator winding 30 is exploded in the circumferential direction D3 and viewed from the axial direction D1. FIG. 16 is an exploded view in which the stator winding 30 is exploded in the circumferential direction D3 and viewed from the radial direction D2.

As shown in FIG. 15 and FIG. 16, each of the phase coils 32U, 32V and 32W of the stator winding 32 are formed by a lead wire that is a single continuous wire being wound around the slots 35 by lap winding. According to the present embodiment, the circling coils Ua1 to Ua8, Ub1 to Ub8, Va1 to Va8, Vb1 to Vb8, Wa1 to Wa8, and Wb1 to Wb8 are provided so as to be spaced at a predetermined magnetic pole pitch (amounting to five slots, according to the present embodiment).

The U-phase coil 32U is provided so as to substantially make a single round around the stator core 31 in a predetermined direction (such as the clockwise direction) and subsequently substantially make a single round in a direction opposite the predetermined direction (such as the counter-clockwise direction).

In addition, when the circling coils Ub1 to Ub8 that serve as a second round are provided after the circling coils Ua1 to Ua8 are provided so as to make a round around the stator core 31, the circling coils Ub1 to Ub8 are arranged so as to be shifted from the circling coils Ua1 to Ua8 by a single slot in the circumferential direction D3.

For example, the circling coil Ub1 is provided so as to be shifted from the circling coil Ua1 by a single slot in the counter-clockwise direction (leftward direction in FIG. 15). In addition, the circling coil Ub8 is provided so as to be shifted from the circling coil Ua2 by a single slot in the counter-clockwise direction. The circling coil Ub7 is provided so as to be shifted from the circling coil Ua3 by a single slot in the counter-clockwise direction. The circling coils Ub6 to Ub1 are also provided so as to be respectively shifted from the circling coils Ua4 to Ua8 by a single slot in the counter-clockwise direction.

As a result, an ith (i being a natural number from 1 to 8) circling coil from the external terminal 320U of the U-phase coil 32U, among the circling coils Ua1 to Ua8, and a 2n+1-ith circling coil among the circling coils Ub1 to Ub8 are housed in each of the slots S1, S7, S13, S19, S25, S31, S37, and S43. For example, the circling coil Ua1 and the circling coil Ub8 of the U-phase coil 32U are housed in the seventh slot S7. Here, this similarly applies to the V-phase coil 32V and the W-phase coil 32W.

Figure 17:
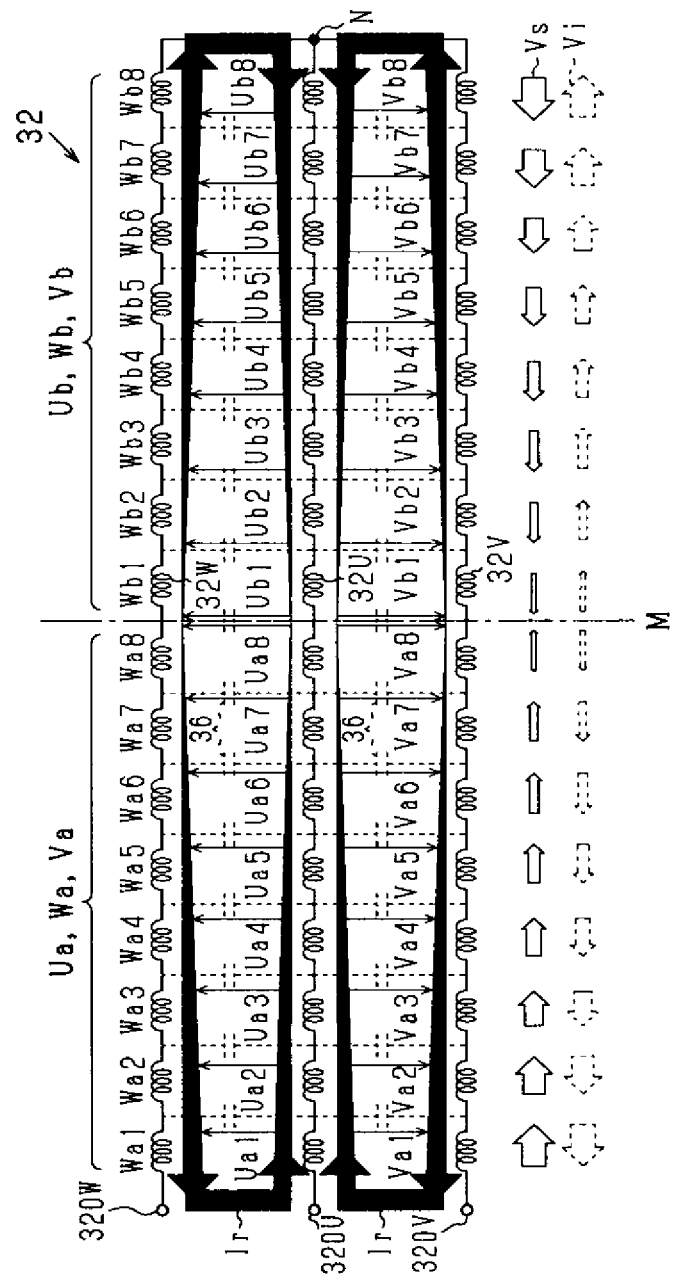
FIG. 17 is a diagram of the resonance current and the surge voltage in the second embodiment.
Figure 18:
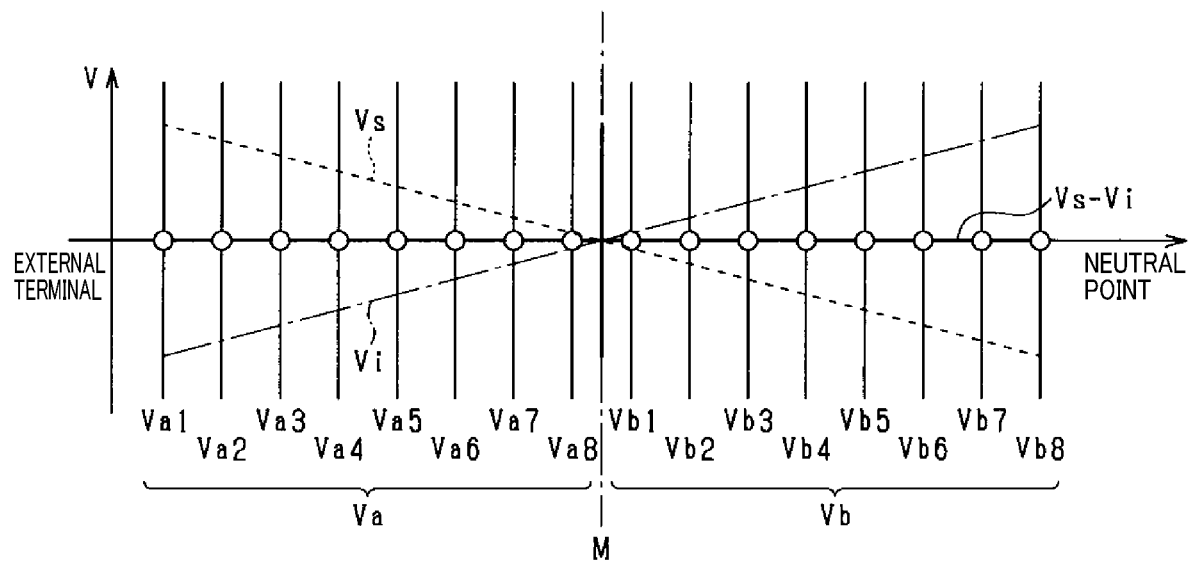
FIG. 18 is a diagram of the surge voltage in the second embodiment.

Next, reduction of the surge voltage according to the second embodiment will be described. In the stator 30 according to the second embodiment as well, the resonance current Ir flows as shown in FIG. 17 at the instant in which switching is performed based on principles similar to those of the conventional configuration. In addition, the surge voltage Vs such as that indicated by solid-line arrows in FIG. 17 and a broken line in FIG. 18 is generated in each circling coil.

However, in the stator 30 according to the present embodiment, the neutral-point-side coils Ub of the U-phase coil 32U are housed in the slots S1, S7, S13, S19, S25, S31, S37, and S43 in which the terminal-side coils Ua of the U-phase coil 32U are housed. Therefore, in a manner similar to that according to the first embodiment, magnetic coupling occurs between the terminal-side coil Ua and the neutral-point-side coil Ub, and the surge voltage Vs(Ua) of the terminal-side coil Ua is reduced by the induced voltage Vi(Ub).

Here, this similarly applies to the slots S3, S9, S15, S21, S27, S33, S39, and S45 in which the terminal-side coils Va and the neutral-point-side coils Vb of the V-phase coil 32V are housed. In addition, this similarly applies to the slots S5, S11, S17, S23, S29, S35, S41, and S47 in which the terminal-side coils Wa and the neutral-point-side coils Wb of the W-phase coil 32W are housed.

Here, the induced voltage Vi increases as the resonance current Ir increases. In addition, the resonance current Ir increases as the circling coil becomes closer to the external terminal 320U side or the neutral point N side. Furthermore, the resonance current Ir flows symmetrically to the terminal-side coils Ua, Va, and Wa and the neutral-point-side coils Ub, Vb, and Wb with the intermediate point M as the center. Here, according to the second embodiment, the ith circling coil from the external terminal 320V of the V-phase coil 32V, among the circling coils Va1 to Va8, and the 2n+1-ith circling coil among the circling coils Vb1 to Vb8 are housed in the slots S3, S9, S15, S21, S27, S33, S39, and S45. That is, two circling coils of which the resonance currents Ir are similar are housed in the slots S3, S9, S15, S21, S27, S33, S39, and S45. In other words, as shown in FIG. 17 and FIG. 18, the two circling coils are housed such that the surge voltage Vs and the induced voltage Vi are balanced.

As a result, as shown in FIG. 17 and FIG. 18, the induced voltage Vi increases as the circling coil become closer to the external-terminal side or the neutral-point side, based on the surge voltage Vs. Therefore, as indicated by a solid line in FIG. 18, the surge voltage Vs is canceled out by the induced voltage Vi.

Figure 19:
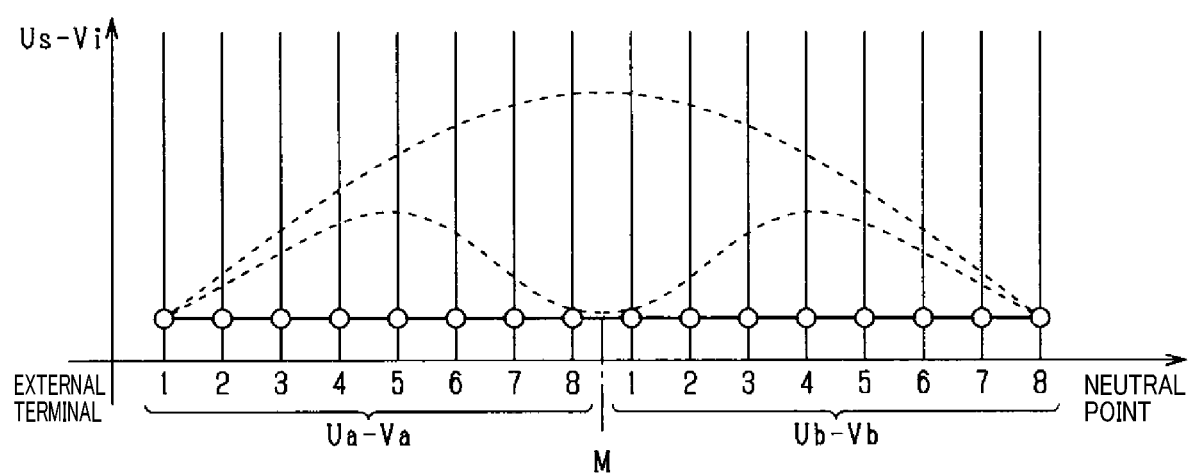
FIG. 19 is a diagram of the potential difference between the U-phase and the V-phase in the second embodiment.

Consequently, when the reduction effect caused by the induced voltages Vi of the circling coils Va1 to Va8 and Vb1 to Vb8 is taken into consideration, as indicated by a solid line in FIG. 19, the potential difference between the U-phase coil 32U and the V-phase coil 32V is reduced to be similar in any circling coil.

As described above, in the phase coils 32U, 32V, and 32W, the resonance current Ir tends to increase towards the end-portion side (the external-terminal side or the neutral-point side). Therefore, the ith circling coil from the external terminal 320U of the U-phase coil 32U, among the circling coils Ua1 to Ua8, and the 2n+1-ith circling coil among the circling coils Ub1 to Ub8 are housed in the slots S1, S7, S13, S19, S25, S31, S37, and S43. In addition, the ith circling coil from the external terminal 320V of the V-phase coil 32V, among the circling coils Va1 to Va8, and the 2n+1-ith circling coil among the circling coils Vb1 to Vb8 are housed in the slots S3, S9, S15, S21, S27, S33, S39, and S45. Furthermore, the ith circling coil from the external terminal 320W of the W-phase coil 32W, among the circling coils Wa1 to Wa8, and the 2n+1-ith circling coil among the circling coils Wb1 to Wb8 are housed in the slots S5, S11, S17, S23, S29, S35, S41, and S47. As a result, the induced voltage Vi that is balanced with the surge voltage Vs can be generated. The surge voltage Vs can be effectively reduced. Consequently, the maximum interphase potential difference can be further reduced.

Other Embodiments

The present disclosure is not limited to the above-described embodiments. Various embodiments are possible without departing from the spirit of the present disclosure. For example, the number of slots, a number of magnetic-pole pairs, a number of turns in a coil, and the number of coils that are housed in a slot can be arbitrarily changed.

What is claimed is:

1. A rotating electric machine comprising:
 a stator that includes a stator core that has a circular cylindrical shape and is provided with a plurality of slots that are arranged in a circumferential direction, and a stator winding that comprises a plurality of phase coils that are wound around the slots; and
 a rotor that is arranged so as to oppose the stator in a radial direction and has a plurality of magnetic poles in the circumferential direction, wherein
 each phase coil is configured such that a first end is connected to an external terminal, a second end is connected to a neutral point, and 2n (n being a natural number) circling coils are arranged so as to circle the stator core and connected in series, and
 a neutral-point-side coil is housed in a first slot in which a terminal-side coil is housed, wherein: the terminal-side coil is a circling coil that is arranged on the external-terminal side of a first phase coil among the phase coils; the neutral-point-side coil is a circling coil that is arranged on the neutral-point side of a second phase coil among the phase coils; and the second phase coil is different in phase from the first phase coil.

2. The rotating electric machine according to claim 1, wherein:
 the terminal-side coil of the first phase coil and the neutral-point-side coil of the first phase coil are housed in a second slot, wherein the second slot differs from the first slot.

3. The rotating electric machine according to claim 2, wherein:
 an ith (i being a natural number) circling coil from the external terminal of the first phase coil and a 2n+1-ith circling coil are housed in the second slot.

4. The rotating electric machine according to claim 2, wherein:
 the first slot and the second slot are alternately arranged in the circumferential direction.

5. The rotating electric machine according to claim 3, wherein:
 the first slot and the second slot are alternately arranged in the circumferential direction.

6. The rotating electric machine according to claim 2, wherein:
 the rotating electric machine is a three-phase alternating-current rotating electric machine;
 the terminal-side coil of the first phase coil and the neutral-point-side coil of the second phase coil are housed in one of first slots adjacent to the second slot in the circumferential direction; and
 the neutral-point-side coil of the first phase coil and the terminal-side coil of a third phase coil that differs from the first phase coil and the second phase coil are housed in the other of first slots adjacent to the second slot in the circumferential direction.

7. The rotating electric machine according to claim 5, wherein:
 the rotating electric machine is a three-phase alternating-current rotating electric machine;
 the terminal-side coil of the first phase coil and the neutral-point-side coil of the second phase coil are housed in one of first slots adjacent to the second slot in the circumferential direction; and
 the neutral-point-side coil of the first phase coil and the terminal-side coil of a third phase coil that differs from the first phase coil and the second phase coil are housed in the other of first slots adjacent to the second slot in the circumferential direction.

8. The rotating electric machine according to claim 1, wherein:
 there is no slot in which the terminal-side coil of the first phase and the terminal-side coil of the second phase are housed in a single slot among the slots provided in the stator core, and
 there is no slot in which the neutral-point-side coil of the first phase and the neutral-point-side coil of the second phase coil are housed in a single slot among the slots provided in the stator core.

9. The rotating electric machine according to claim 2, wherein:
 there is no slot in which the terminal-side coil of the first phase and the terminal-side coil of the second phase are housed in a single slot among the slots provided in the stator core, and
 there is no slot in which the neutral-point-side coil of the first phase and the neutral-point-side coil of the second phase coil are housed in a single slot among the slots provided in the stator core.

10. The rotating electric machine according to claim 7, wherein:
 there is no slot in which the terminal-side coil of the first phase and the terminal-side coil of the second phase are housed in a single slot among the slots provided in the stator core, and
 there is no slot in which the neutral-point-side coil of the first phase and the neutral-point-side coil of the second phase coil are housed in a single slot among the slots provided in the stator core.

* * * * *